(12) United States Patent
Manolakos et al.

(10) Patent No.: US 12,081,477 B2
(45) Date of Patent: Sep. 3, 2024

(54) PUNCTURING INDICATOR OF A PORTION OF A REFERENCE SIGNAL WITHIN AN UNPUNCTURED PORTION OF THE REFERENCE SIGNAL

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/306,114

(22) Filed: Apr. 24, 2023

(65) Prior Publication Data

US 2023/0318774 A1 Oct. 5, 2023

Related U.S. Application Data

(63) Continuation of application No. 16/991,959, filed on Aug. 12, 2020, now Pat. No. 11,695,524.

(30) Foreign Application Priority Data

Aug. 13, 2019 (GR) .............................. 20190100353

(51) Int. Cl.
*H04L 5/00* (2006.01)
*H04W 72/044* (2023.01)
*H04W 72/54* (2023.01)

(52) U.S. Cl.
CPC ....... *H04L 5/0048* (2013.01); *H04W 72/0466* (2013.01); *H04W 72/54* (2023.01)

(58) Field of Classification Search
CPC . H04L 5/0048; H04L 5/001; H04L 27/26025; H04L 5/0026; H04L 5/0053;
(Continued)

(56) References Cited

U.S. PATENT DOCUMENTS

2018/0241508 A1* 8/2018 Chervyakov ........... H04W 4/40
2018/0278454 A1 9/2018 Islam et al.
(Continued)

FOREIGN PATENT DOCUMENTS

| WO | 2018117666 A1 | 6/2018 |
| WO | 2018123956 A1 | 7/2018 |

(Continued)

OTHER PUBLICATIONS

"Remaining aspects on pre-emption indication for DL multiplexing of URLLC and eMBB", 3GPP TSG RAN WG1 Meeting #91, Reno, USA (R1-1721452) (Year: 2017).*
(Continued)

*Primary Examiner* — Ian N Moore
*Assistant Examiner* — Sun Jong Kim
(74) *Attorney, Agent, or Firm* — Muncy, Geissler, Olds & Low, P.C.

(57) ABSTRACT

Disclosed are techniques related to wireless communication system in which a network node (e.g., a base station, gNB, etc.) may be allowed to puncture a reference signal (RS) to deliver high priority data (e.g., URLLC data) to a user equipment (UE) that is not currently being served by the network node. The RS may comprise a puncturable subset and an unpuncturable subset. The puncturable subset may comprise resources of the RS that are allowed to be punctured, and the unpuncturable subset may comprise resources of the RS that are prohibited from being punctured. The network node may transmit the RS such that unpuncturable
(Continued)

subset indicates whether or not the puncturable subset of the RS has or has not been punctured.

30 Claims, 20 Drawing Sheets

(58) Field of Classification Search
CPC ... H04L 5/0073; H04L 5/0091; H04L 5/0044; H04L 5/0064; H04L 27/2613; H04L 27/26132; H04W 72/0466; H04W 72/54
See application file for complete search history.

(56) References Cited

U.S. PATENT DOCUMENTS

| | | |
|---|---|---|
| 2019/0098608 A1 | 3/2019 | Yi et al. |
| 2020/0077470 A1 | 3/2020 | Xiong et al. |
| 2020/0195328 A1* | 6/2020 | Wu ............... H04L 5/0048 |
| 2021/0050974 A1 | 2/2021 | Manolakos et al. |
| 2021/0298088 A1 | 9/2021 | Qi et al. |

FOREIGN PATENT DOCUMENTS

| | | | | |
|---|---|---|---|---|
| WO | WO-2019001523 A1 * | 1/2019 | ........... | H04L 1/0018 |
| WO | 2019096266 A1 | 5/2019 | | |
| WO | 2019103797 A1 | 5/2019 | | |

OTHER PUBLICATIONS

Translation WO 2019001523 A1 (Year: 2019).*
Huawei., et al., "Remaining Aspects on Pre-Emption Indication for DL Multiplexing of URLLC and eMBB", 3GPP Draft, 3GPP TSG RAN WG1 Meeting #91, R1-1721452, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 28, 2017 (Nov. 28, 2017), XP051363896, 11 Pages, Figures 1-6, Sections 1-8, Sections 2 and 5, Section 5.2.
International Preliminary Report on Patentability—PCT/US2020/046234The International Bureau of WIPO—Geneva, Switzerland, Feb. 24, 2022.
International Search Report and Written Opinion—PCT/US2020/046234—ISAEPO—Nov. 20, 2020.
LG Electronics: "Discussion on Multiplexing of eMBB and URLLC", R1-1700512, 3GPP TSG RAN WG1 NR Ad-hoc Meeting, Discussion on Multiplexing of eMBB and URLLC, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 10, 2017 (Jan. 10, 2017), Jan. 20, 2017, XP051202934, 10 Pages, Section 2.2.
Taiwan Search Report—TW109127620—TIPO—Oct. 31, 2023.
Huawei, et al., "Remaining aspects on pre-emption indication for DL multiplexing of URLLC and eMBB", 3GPP TSG RAN WG1 Meeting #91, R1-1721452, Reno, USA, Nov. 27-Dec. 1, 2017, Nov. 28, 2017, 11 Pages.
Taiwan Search Report—TW109127620—TIPO—May 15, 2024.

* cited by examiner

PUNCTURING INDICATOR OF A PORTION OF A REFERENCE SIGNAL WITHIN AN UNPUNCTURED PORTION OF THE REFERENCE SIGNAL

CROSS-REFERENCE TO RELATED APPLICATION

The present Application for Patent is a continuation of U.S. patent application Ser. No. 16/991,959, entitled "PUNCTURING INDICATOR OF A PORTION OF A REFERENCE SIGNAL WITHIN AN UNPUNCTURED PORTION OF THE REFERENCE SIGNAL," filed Aug. 12, 2020, which claims priority under 35 U.S.C. § 119 to Greek Patent Application No. 20190100353, entitled "PUNCTURING INDICATOR OF A PORTION OF A REFERENCE SIGNAL WITHIN AN UNPUNCTURED PORTION THE REFERENCE SIGNAL," filed Aug. 13, 2019, each of which is assigned to the assignee hereof, and expressly incorporated herein by reference in its entirety.

BACKGROUND OF THE DISCLOSURE

1. Field of the Disclosure

Various aspects described herein generally relate to wireless communication.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

One or more aspects may be directed to a network entity. The network entity may comprise a transceiver, a memory, and a processor communicatively coupled to the transceiver and the memory. The processor may be configured to configure a reference signal (RS) such that the RS is puncturable by another physical layer signal. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The RS may be configured such that when the RS is transmitted, the unpuncturable subset of the RS indicates whether the puncturable subset of the RS has or has not been punctured. The processor may also be configured to provide, via the transceiver, an RS configuration to a user equipment (UE). The RS configuration may indicate the configuration of resources of the RS.

One or more aspects may be directed to a method of wireless communication performed by a network entity. The method may comprise configuring an RS such that the RS is puncturable by another physical layer signal. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The RS may be configured such that when the RS is transmitted, the unpuncturable subset of the RS indicates whether the puncturable subset of the RS has or has not been punctured. The method may also comprise providing an RS configuration to a UE. The RS configuration may indicate the configuration of resources of the RS.

One or more aspects may also be directed to a network entity. The network entity may comprise means for configuring an RS such that the RS is puncturable by another physical layer signal. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The RS may be configured such that when the RS is transmitted, the unpuncturable subset of the RS indicates whether the puncturable subset of the RS has or has not been punctured. The network entity may also comprise means for providing an RS configuration to a UE. The RS configuration may indicate the configuration of resources of the RS.

One or more aspects may also be directed a non-transitory computer-readable medium storing computer-executable instructions for a network entity. The computer-executable instructions may comprise one or more instructions causing the network entity to configure an RS such that the RS is puncturable by another physical layer signal. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The RS may be configured such that when the RS is transmitted, the unpuncturable subset of the RS indicates whether the puncturable subset of the RS has or has not been punctured. The computer-executable instructions may also comprise one or more instructions causing the network entity to provide an RS configuration to a UE. The RS configuration may indicate the configuration of resources of the RS.

One or more aspects may be directed to a UE. The UE may comprise a transceiver, a memory, and a processor communicatively coupled to the transceiver and the memory. The processor may be configured to receive, via the transceiver, an RS from a non-serving cell. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The processor may also be configured to determine whether or not the puncturable subset has been punctured by another physical layer signal based on the unpuncturable subset. The processor may further be configured to exclude the puncturable subset when processing the RS when it is determined that the puncturable subset has been punctured. The processor may yet further be configured to include the puncturable subset when processing the RS when it is determined that the puncturable subset has not been punctured.

One or more aspects may be directed to a method of wireless communication performed by a UE. The method may comprise receiving an RS from a non-serving cell. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The method may also comprise determining whether or not the puncturable subset has been punctured by another physical layer signal based on the unpuncturable subset. The method may further comprise excluding the puncturable subset when processing the RS when it is determined that the puncturable subset has been punctured. The method may yet further comprise including the puncturable subset when processing the RS when it is determined that the puncturable subset has not been punctured One or more aspects may also be directed to a UE. The UE may comprise means for receiving an RS from a non-serving cell. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The UE may also comprise means for determining whether or not the puncturable subset has been punctured by another physical layer signal based on the unpuncturable subset. The UE may further comprise means for excluding the puncturable subset when processing the RS when it is determined that the puncturable subset has been punctured. The UE may yet further comprise means for including the puncturable subset when processing the RS when it is determined that the puncturable subset has not been punctured.

One or more aspects may also be directed a non-transitory computer-readable medium storing computer-executable instructions for a UE. The computer-executable instructions may comprise one or more instructions causing the UE to receive an RS from a non-serving cell. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The computer-executable instructions may also comprise one or more instructions causing the UE to determine whether or not the puncturable subset has been punctured by another physical layer signal based on the unpuncturable subset. The computer-executable instructions may further comprise one or more instructions causing the UE to exclude the puncturable subset when processing the RS when it is determined that the puncturable subset has been punctured. The computer-executable instructions may yet further comprise one or more instructions causing the UE to include the puncturable subset when processing the RS when it is determined that the puncturable subset has not been punctured.

One or more aspects may be directed to a network node. The network node may comprise a transceiver, a memory, and a processor communicatively coupled to the transceiver and the memory. The processor may be configured to transmit, via the transceiver, an RS to a UE not currently being served by the network node. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The unpuncturable subset may indicate whether the puncturable subset of the RS has or has not been punctured by another physical layer signal.

One or more aspects may be directed to a method of a network node. The method may comprise transmitting an RS to a UE not currently being served by the network node. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The unpuncturable subset may indicate whether the puncturable subset of the RS has or has not been punctured by another physical layer signal.

One or more aspects may also be directed to a network node. The network node may comprise means for transmitting an RS to a UE not currently being served by the network node. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The unpuncturable subset may indicate whether the puncturable subset of the RS has or has not been punctured by another physical layer signal.

One or more aspects may also be directed a non-transitory computer-readable medium storing computer-executable instructions for a network node. The computer-executable instructions may comprise one or more instructions causing the network node to transmit an RS to a UE not currently being served by the network node. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The unpuncturable subset may indicate whether the puncturable subset of the RS has or has not been punctured by another physical layer signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
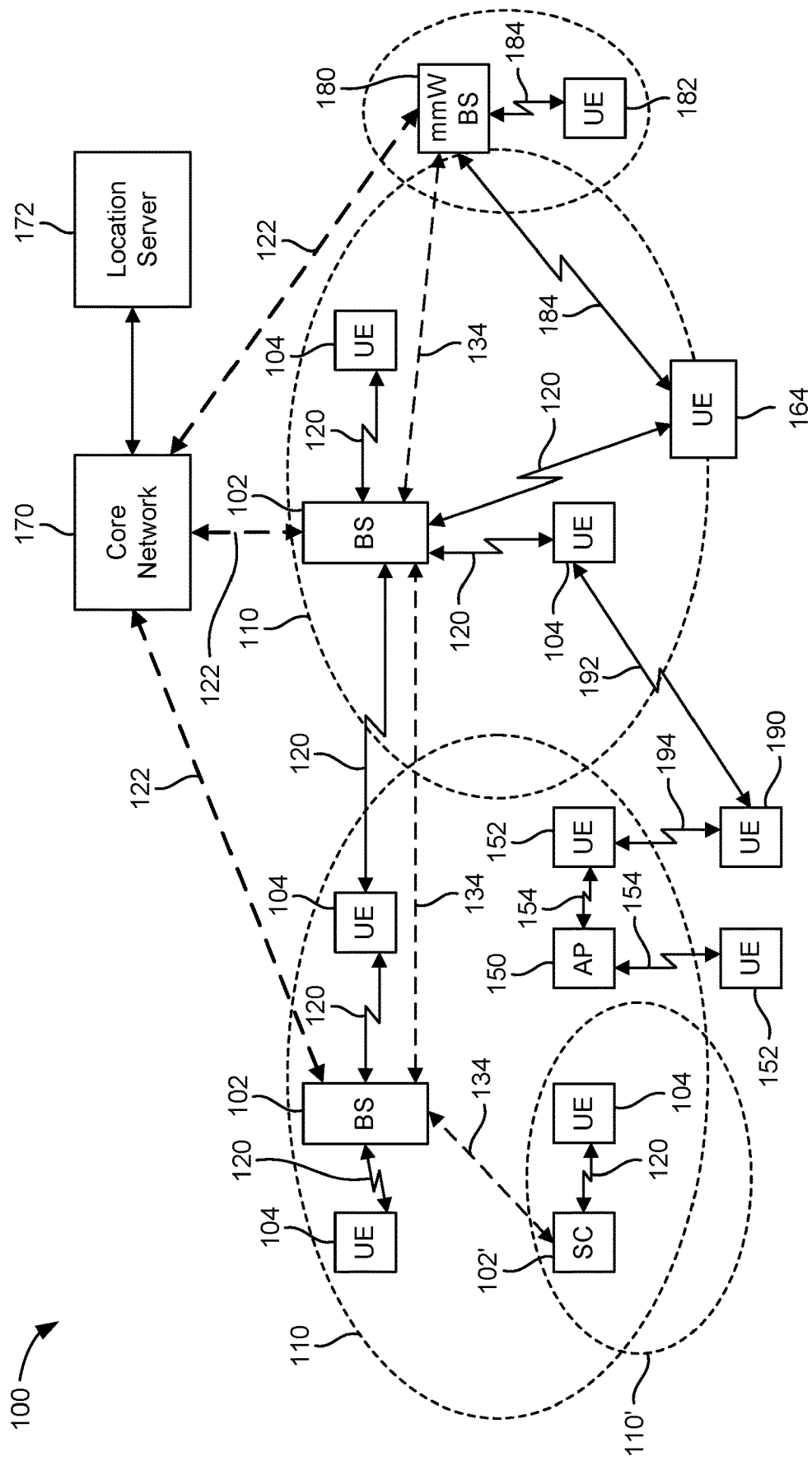
FIG. 1 illustrates an exemplary wireless communications system, according to aspects of the disclosure.

Various aspects described herein generally relate to wireless communication systems, and more particularly, to indicate whether or not a reference signal (RS) is punctured. In an aspect, a network node (e.g., a base station, gNB, etc.) may be allowed to puncture a reference signal, such as a positioning reference signal (PRS) to deliver high priority data such as ultra-reliable low-latency communication (URLLC) data to a user equipment (UE) even when the UE is not currently being served by the network node. In particular, the RS may be configured to comprise a puncturable subset and an unpuncturable subset. The puncturable subset may comprise one or more resources of the RS that are allowed to be punctured, and the unpuncturable subset may comprise one or more resources of the RS that are prohibited from being punctured. The network node may transmit the RS such that unpuncturable subset indicates whether or not the puncturable subset of the RS has been punctured. In this way, the network can quickly inform whether or not the RS has been punctured to carry high priority data.

These and other aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IOT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAS 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
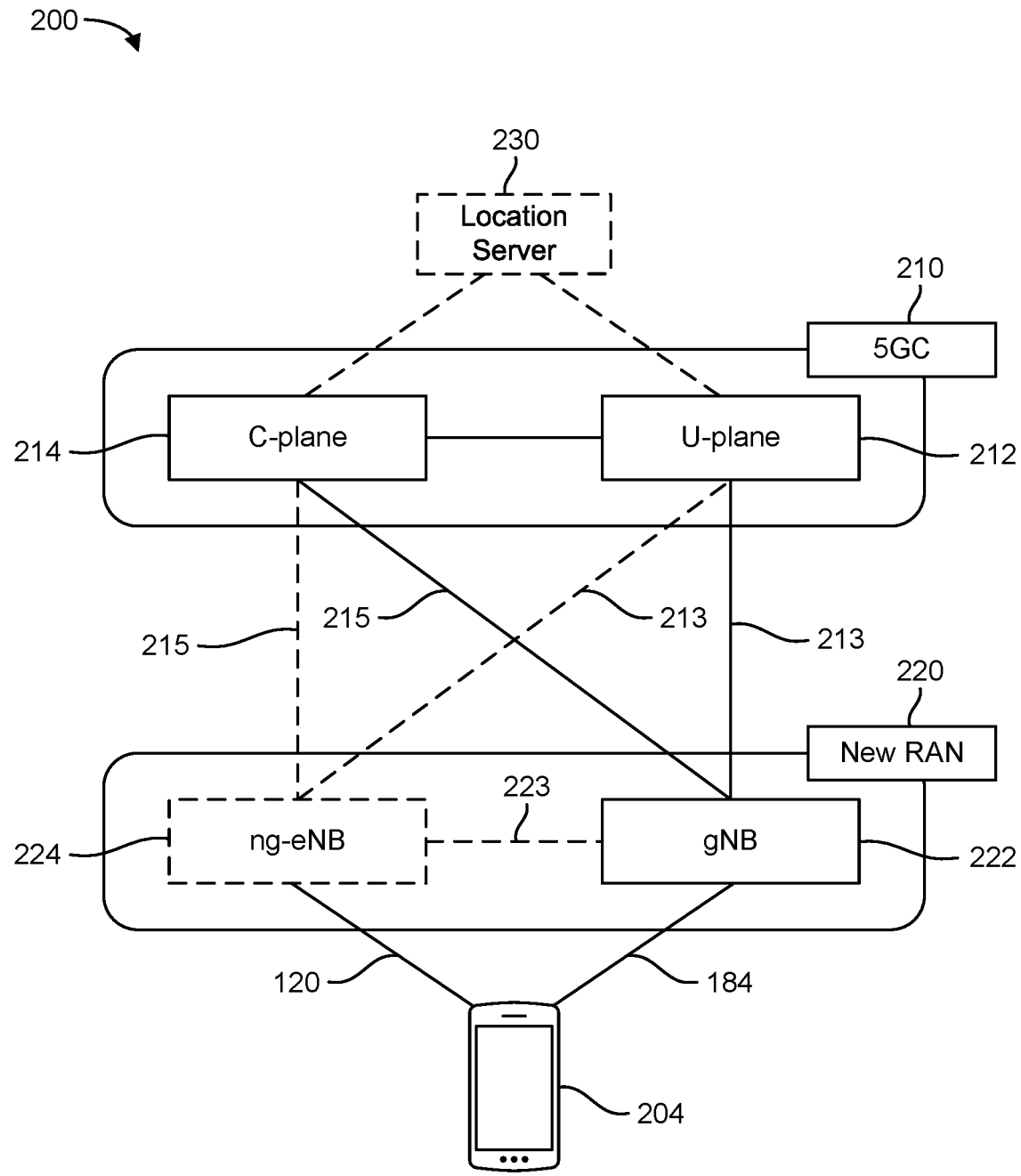
FIGS. 2A and 2B illustrate example wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-NB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
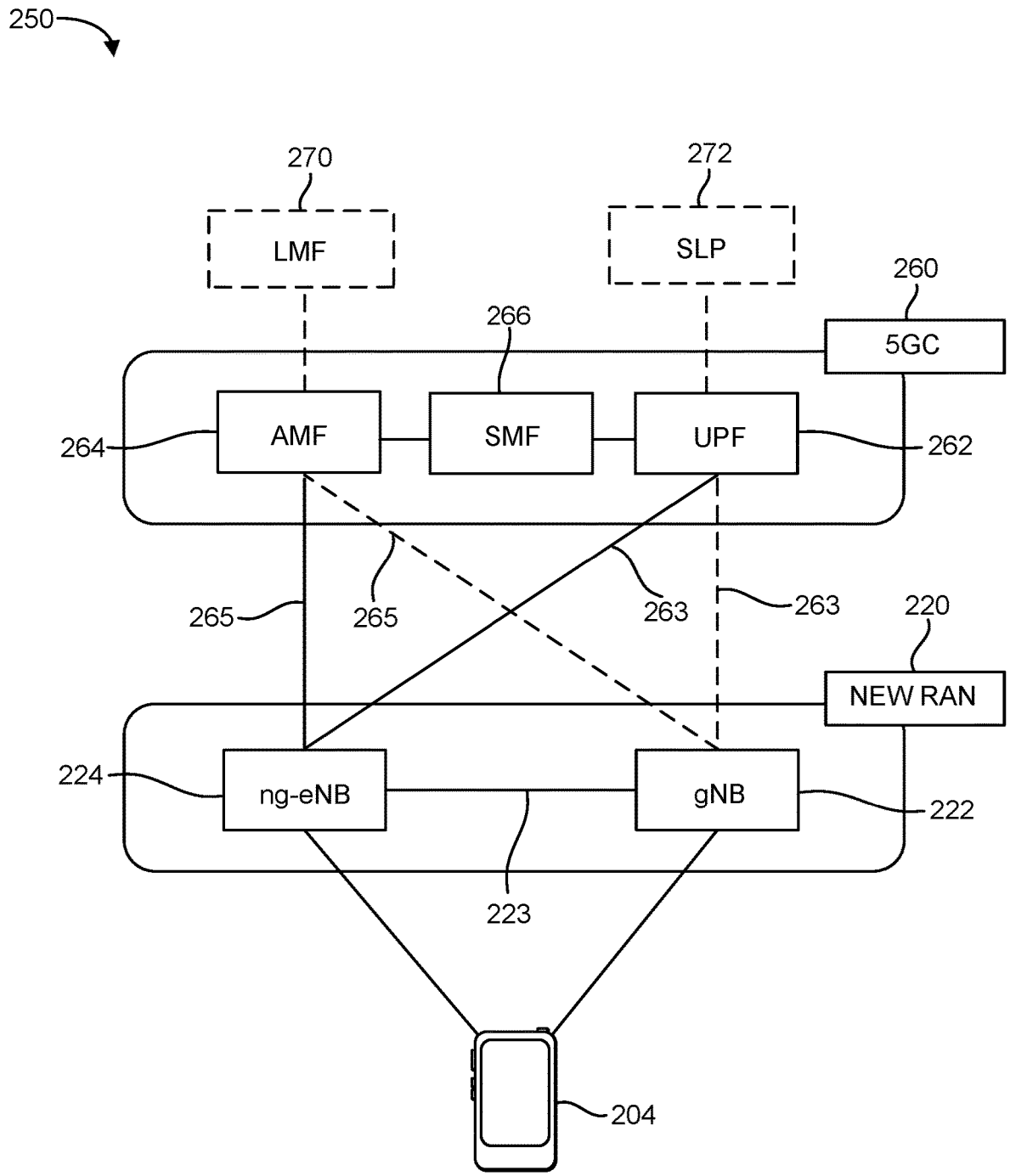

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-cNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-NB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
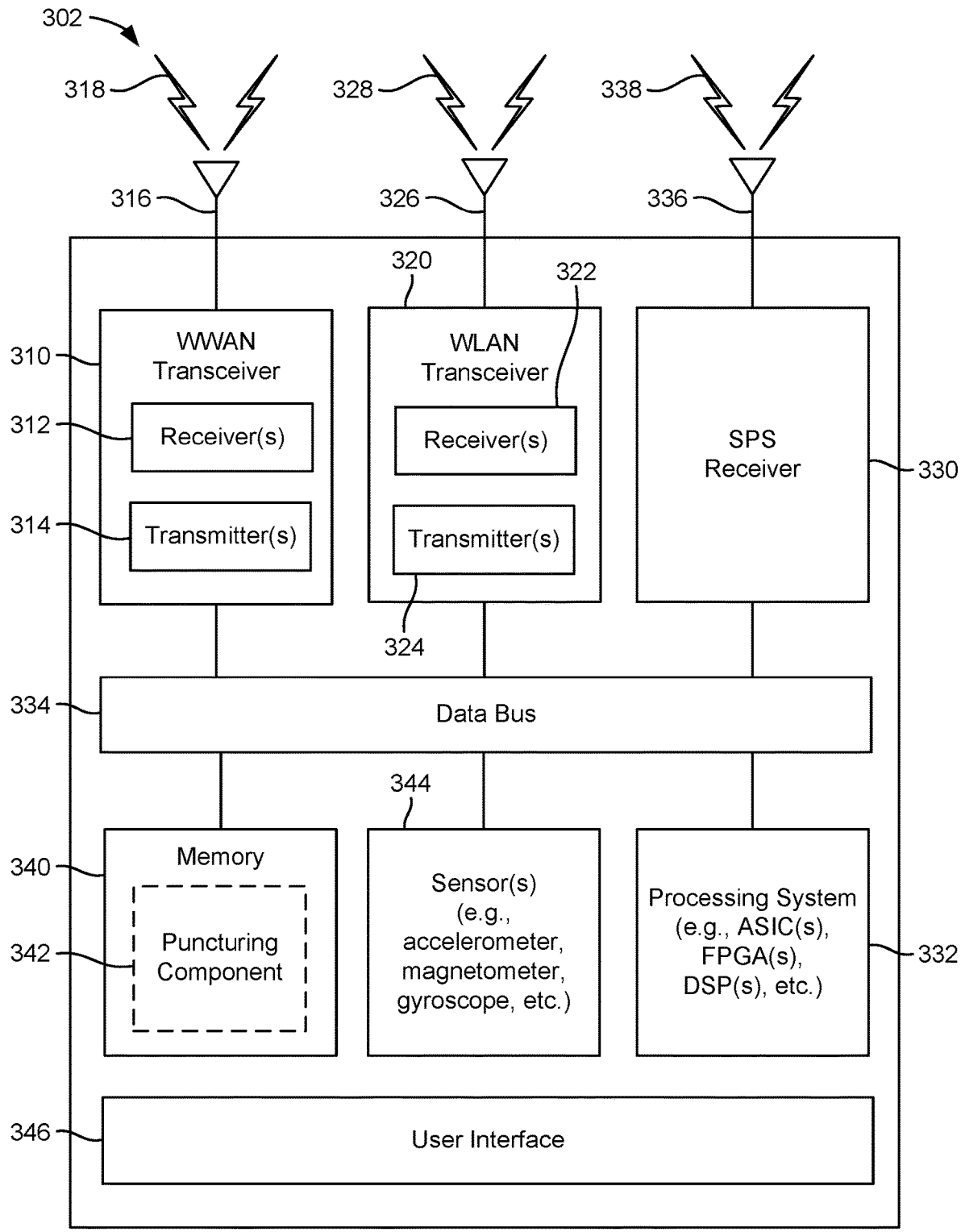
FIGS. 3A to 3C are simplified block diagrams of several sample aspects of components that may be employed in wireless communication nodes and configured to support communication as taught herein.
Figure 3B:
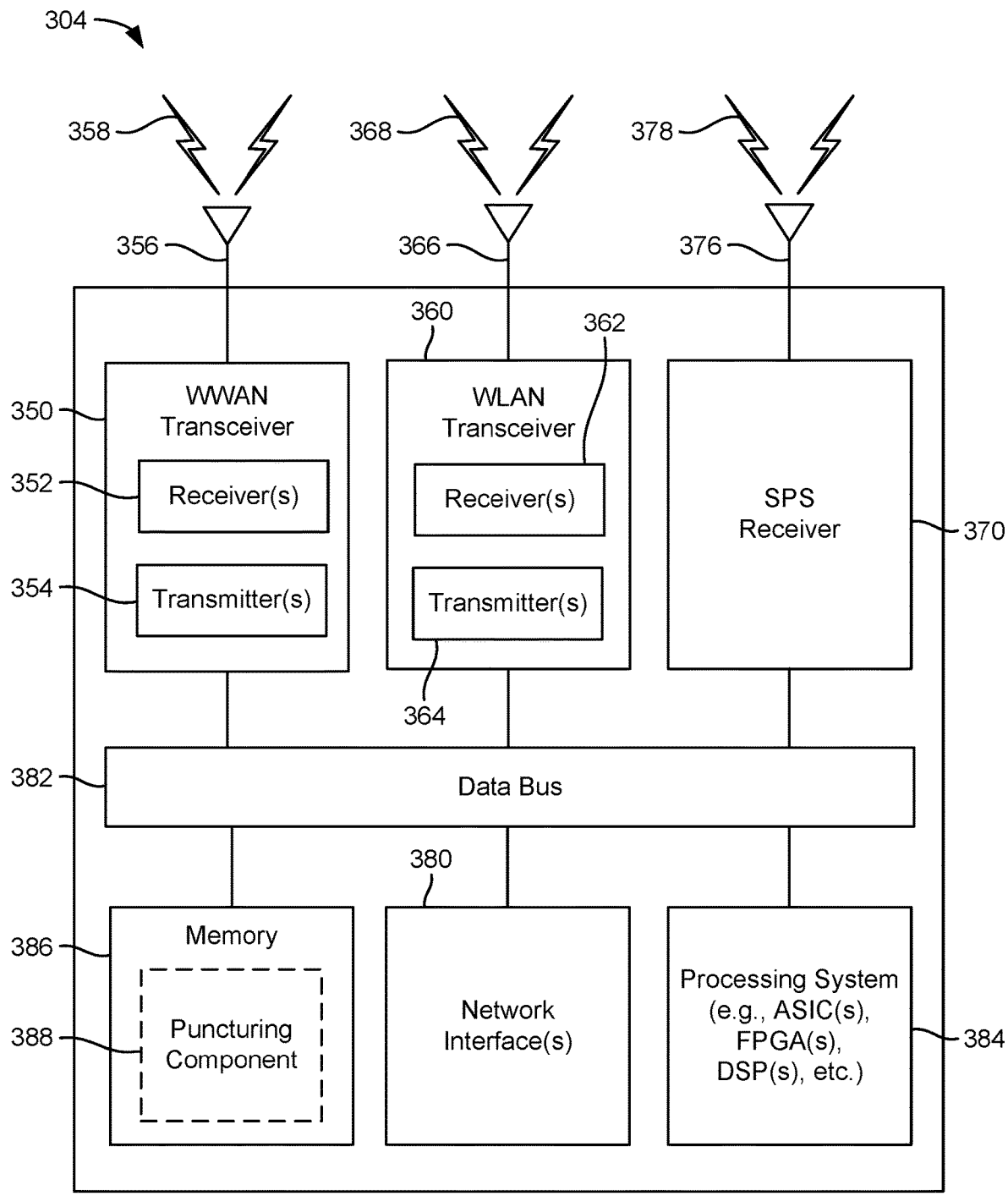
Figure 3C:
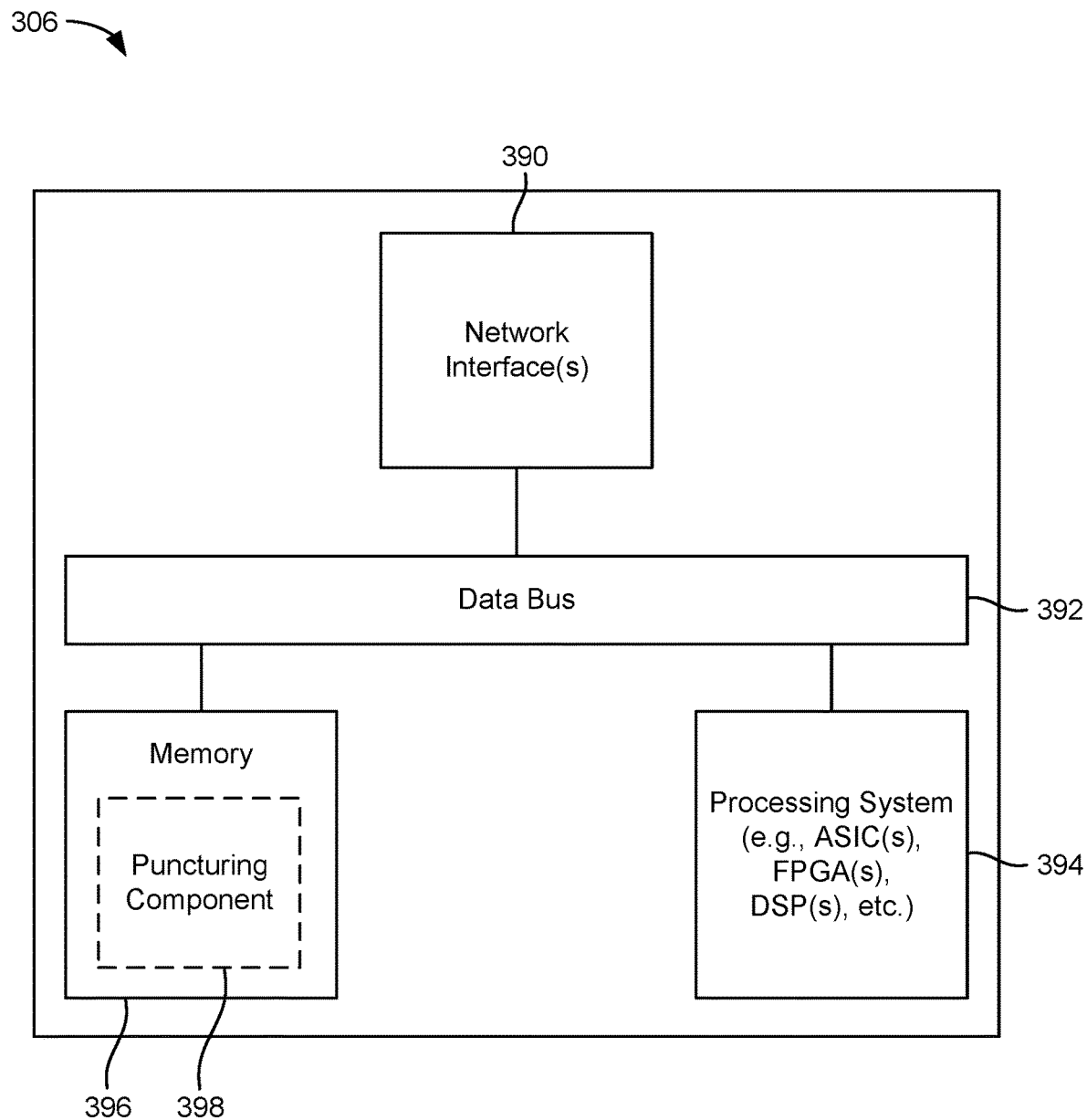

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless communication, and for providing other processing functionality. The base station 304 includes a processing system 384 for providing functionality relating to, for example, wireless communication as disclosed herein, and for providing other processing functionality. The network entity 306 includes a processing system 394 for providing functionality relating to, for example, wireless communication as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGAs), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include puncturing components 342, 388, and 398, respectively. The puncturing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the puncturing components 342, 388, and 398 may be external to the processing systems 332, 384, and 394 (e.g., part of a modem processing system, integrated with another processing system, etc.). Alternatively, the puncturing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging. RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the puncturing components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
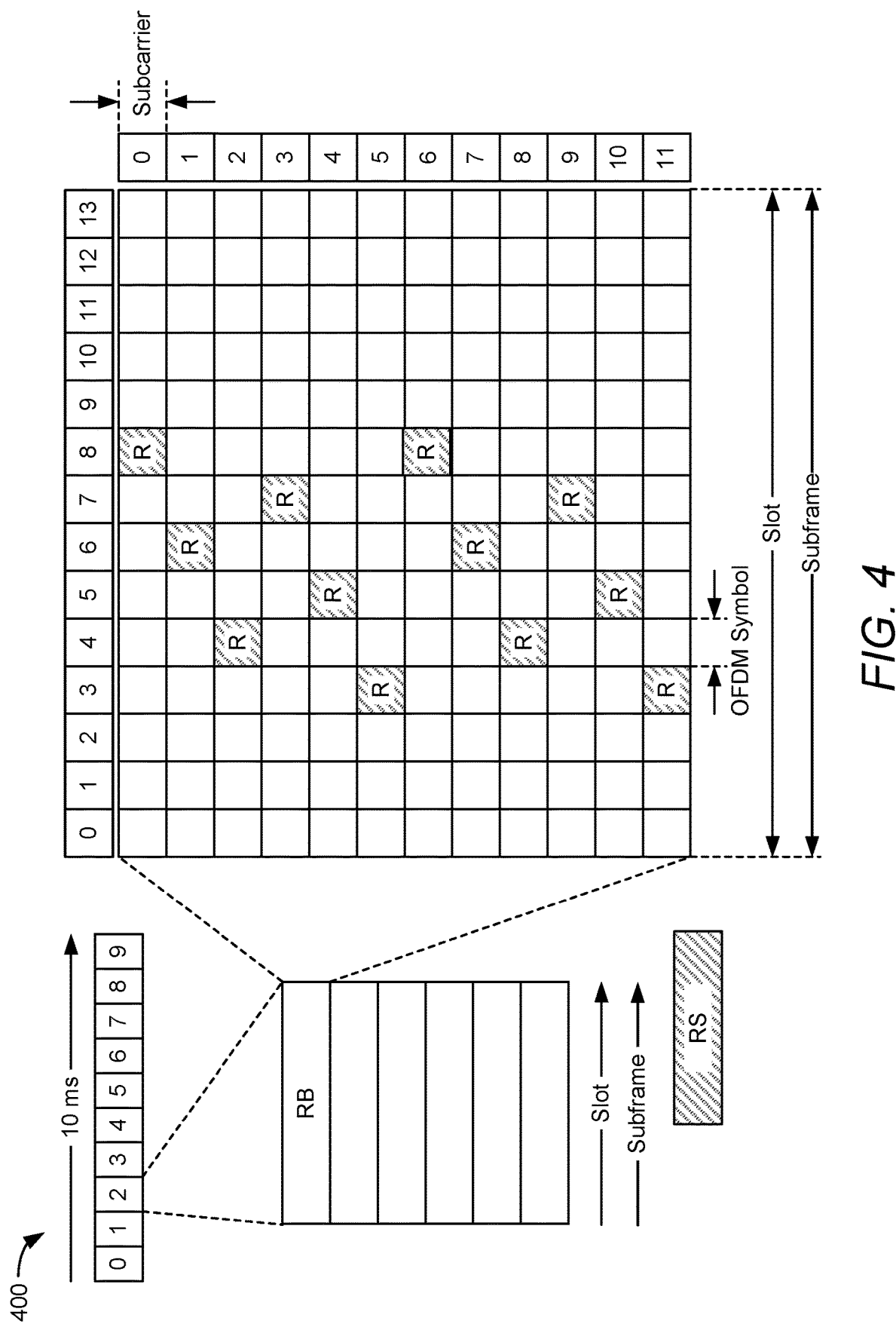
FIGS. 4 and 5 are diagrams illustrating example frame structures and channels within the frame structures, according to aspects of the disclosure.
Figure 5:
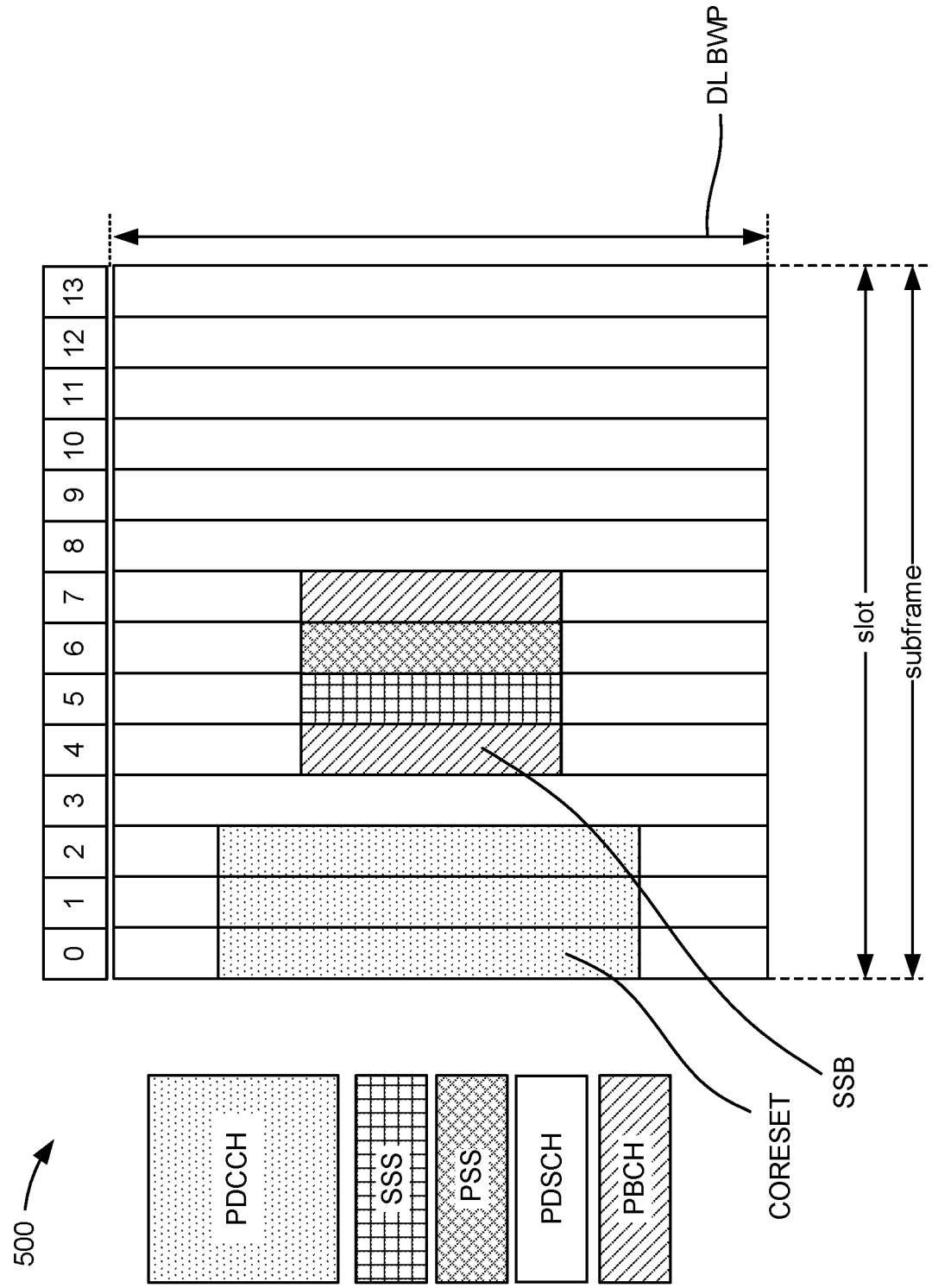

Various frame structures may be used to support downlink and uplink transmissions between network nodes (e.g., base stations and UEs). FIG. 4 is a diagram 400 illustrating an example of a downlink frame structure, according to aspects of the disclosure. FIG. 5 is a diagram 500 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (u), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4 and 5, a numerology of 15 kHz is used. Thus, in the time domain, a 10 millisecond (ms) frame is divided into 10 equally sized subframes of 1 ms each, and each subframe includes one time slot. In FIGS. 4 and 5, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4 and 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4 illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4 illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5120, 10240\}$ slots, with μ=0, 1, 2, 3. The repetition factor may have a length selected from {1, 2, 4, 6, 8, 16, 32} slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 5 illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 6:
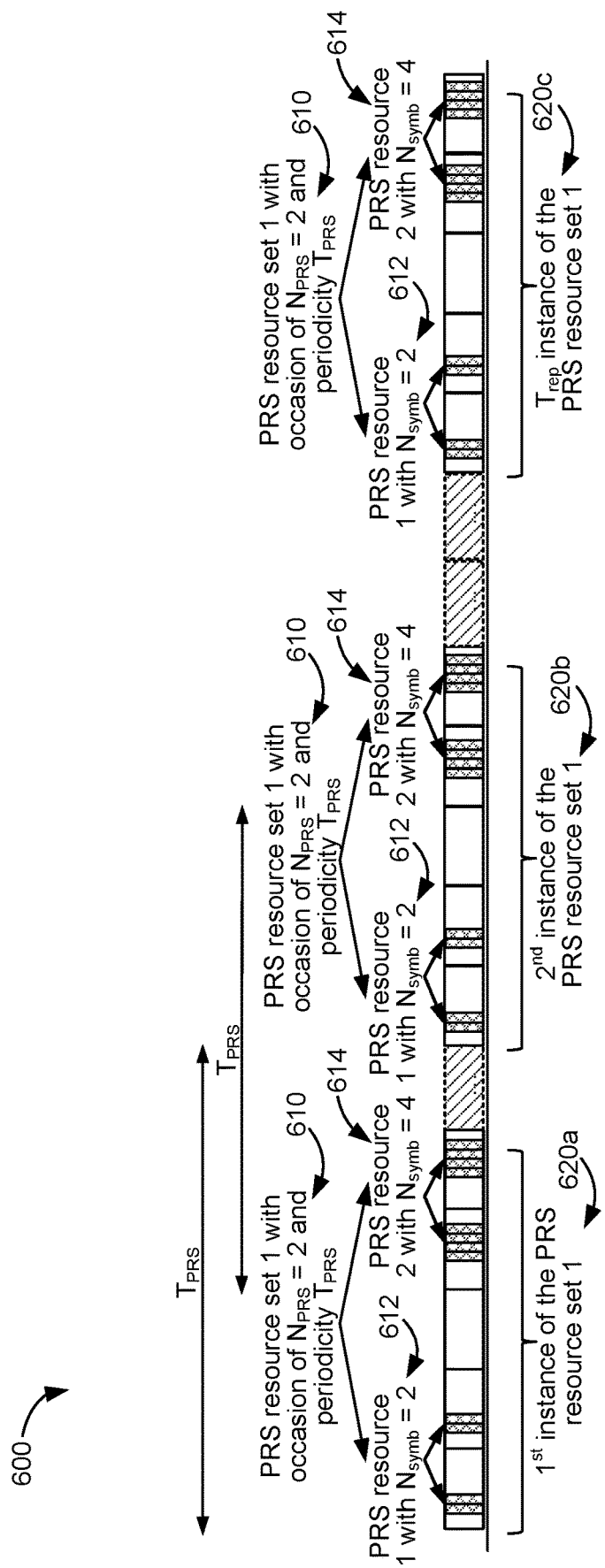
FIG. 6 is a diagram of an exemplary positioning reference signal (PRS) configuration for the PRS transmissions of a given base station, according to aspects of the disclosure.

FIG. 6 is a diagram of an exemplary PRS configuration 600 for the PRS transmissions of a given base station, according to aspects of the disclosure. In FIG. 6, time is represented horizontally, increasing from left to right. Each long rectangle represents a slot and each short (shaded) rectangle represents an OFDM symbol. The PRS configuration 600 identifies the PRS resources 612 and 614 of a PRS resource set 610 during which the base station transmits PRS. The PRS resource set 610 has an occasion length NPRS of two (2) slots and a periodicity of TPRS (e.g., 160 subframes or 160 ms). As such, both the PRS resources 612 and 614 are two consecutive slots in length and repeat every TPRS subframes, starting from the slot in which the first symbol of the respective PRS resource occurs.

In the example of FIG. 6, the PRS resource set 610 includes two PRS resources, a first PRS resource 612 (labeled "PRS resource 1" in FIG. 6) and a second PRS resource 614 (labeled "PRS resource 2" in FIG. 6). The PRS resource 612 and the PRS resource 614 may be transmitted on separate beams of the same base station. The PRS resource 612 has a symbol length Nsymb of two (2) symbols, and the PRS resource 614 has a symbol length Nsymb of four (4) symbols.

Each instance of the PRS resource set 610, illustrated as instances 630a, 630b, and 630c, includes an occasion of length '2' (i.e., NPRS=2) for each PRS resource 612, 614 of the PRS resource set. The PRS resources 612 and 614 are repeated every TPRS subframes up to the muting sequence periodicity TREP. As such, a bitmap of length TREP would be needed to indicate which occasions of instances 630a, 630b, and 630c are muted.

In an aspect, there may be additional constraints on a PRS configuration, such as PRS configuration 600 illustrated in FIG. 6. For example, for all PRS resources (e.g., PRS resources 612, 614) of a PRS resource set (e.g., PRS resource set 610), the base station can configure the following parameters to be the same: (a) the occasion length (e.g., TPRS), (b) the number of symbols (e.g., Nsymb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

In 5G NR, multiple traffic types may be supported, including enhanced mobile broad band (eMBB) and ultra-reliable low-latency communication (URLLC). Ongoing eMBB transmission may be punctured or interrupted to send higher priority URLLC transmission. Puncturing is a technique whereby when a lower priority signal overlaps (collides) with a higher priority signal in a symbol or slot, the transmission of the lower priority signal in the symbol or slot is canceled. This can cause loss of phase coherence between the two eMBB transmit durations that have been made non-contiguous by the URLLC transmission. For example, loss of phase coherence can occur in the uplink when the URLLC transmission has a different transmit power. As another example, when the URLLC transmission is scheduled in a different component carrier (CC) or BWP, the UE may have to tune away from the ongoing eMBB communication to receive (on the downlink) or transmit (on the uplink) the ULRRC traffic and then tune back for eMBB traffic. This can cause loss of phase coherence.

Puncturing may be indicated through a multiplexing approach. Such indication-based multiplexing approach can be beneficial for both the ULRRC UE and the cMBB UE at the cost of indicator overhead. When ongoing eMBB traffic is preempted or punctured with URLLC traffic, a preemption indication (PI) DCI may be used to notify that puncturing has taken place. Unless specifically indicated otherwise, "puncturing" and "preempting" may be used synonymously. Thus, "PI" may also refer to "puncturing indication."

Figure 7A:
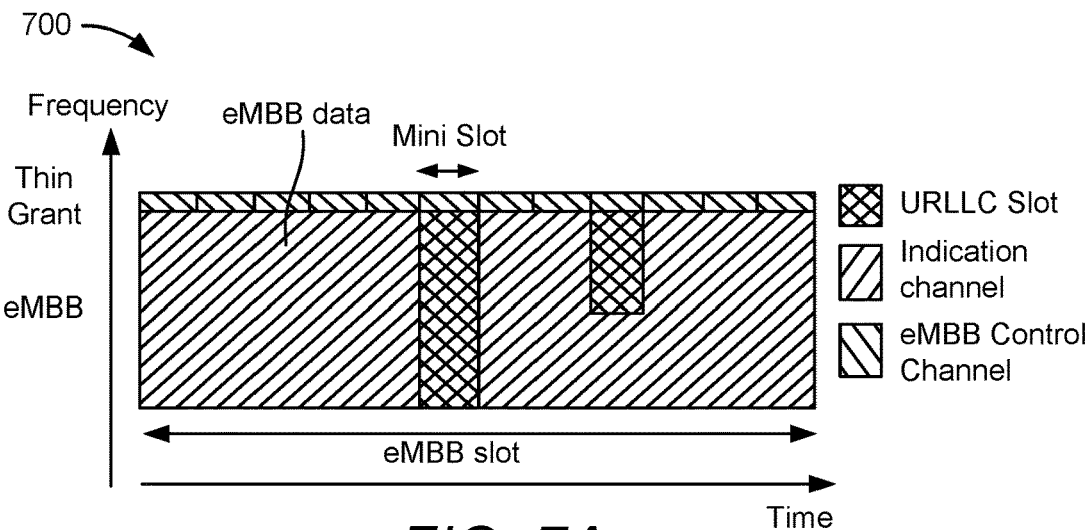
FIGS. 7A to 7C illustrate example techniques to indicate that an ongoing enhanced mobile broadband (eMBB) traffic has been punctured with ultra-reliable low-latency communication (URLLC) traffic, according to aspects of the disclosure.
Figure 7B:
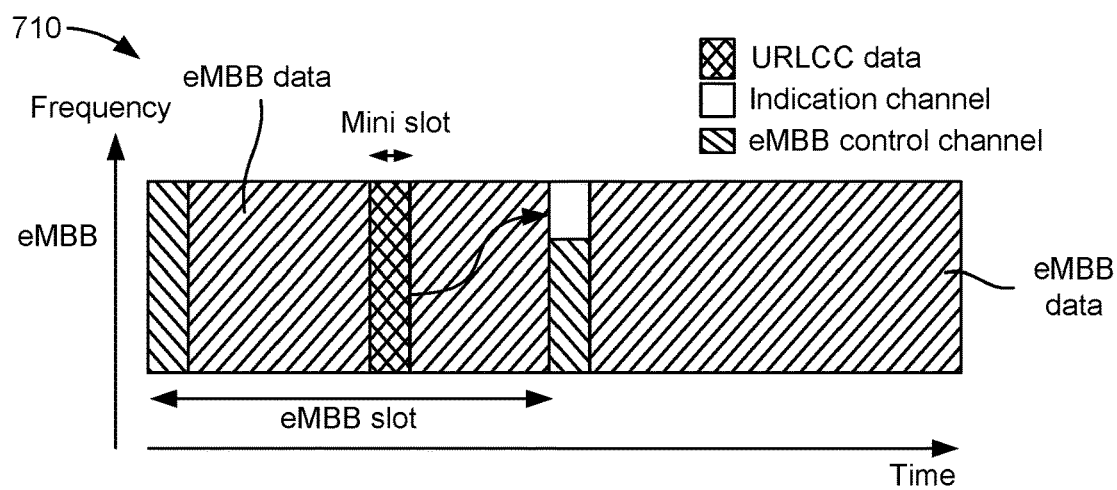
Figure 7C:
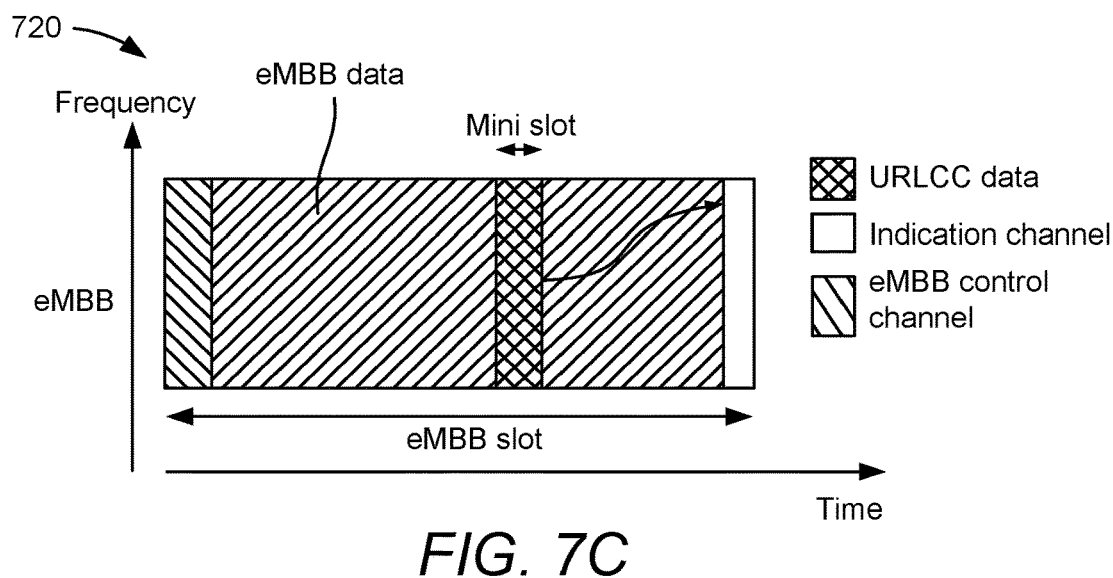

FIGS. 7A, 7B, and 7C illustrate different ways of indicating that ongoing eMBB traffic has been punctured with URLLC traffic. In these figures, it may be assumed that the "mini-slot" allocated for eMBB traffic is punctured to carry the URLLC traffic. FIG. 7A is a diagram 700 of an example of a current indication with respect to URLLC traffic. In this instance, the PI DCI resources (i.e., indication channel resources) span the entire slot. Thus, the PI DCI indicating the punctured resources can be provided in the same time resources (e.g., same slot) as the punctured resources.

FIG. 7B is a diagram 710 of an example of a post indication with respect to both URLLC and eMBB traffic. In this example, the PI DCI resources (indication channel) are illustrated as resources of the next eMBB slot. FIG. 7C is a diagram 720 of an example of a post indication with respect to URLLC traffic, but current with cMBB traffic. In this example, the PI DCI resources are illustrated as occupying resources of the current eMBB slot, but occupy time resources (symbols) subsequent the resources punctured with the URLLC traffic.

Currently, DCI format 2_1 is used for notifying the PRB(s) and OFDM symbol(s) where a UE may assume no transmission is intended for the UE. For example, a gNB can schedule an eMBB UE during a slot. When a packet for a URLLC UE (same as or different from the eMBB UE) arrives in the middle of the slot, the gNB can schedule and transmit the packet to the URLLC UE in a subset of resource blocks (RBs)/slots scheduled for the eMBB UE. The gNB then indicates via a DL PI (e.g., in the next slot) to the eMBB UE which part of RBs/symbols are punctured (used for URLLC UE).

The eMBB UE can use this information to enhance the chance of decoding the data traffic. For example, the eMBB UE may zero out the log-likelihood ratios (LLRs) of the punctured resources. This is likely to result in better decoding performance of the eMBB traffic in the remaining non-punctured resources.

The following information can be transmitted through a DCI under DCI format 2_1 with the cyclic redundancy check (CRC) scrambled by the interruption radio network temporary identifier (INT-RNTI):
   PI_1 (puncturing indication 1), PI_2 (puncturing indication 2), . . . , PI_N (puncturing indication N).
   Each puncturing indication may be some number of bits (e.g., 14 bits).
   For each UE, different preemption indications can correspond to different component carriers (serving cells).

Figure 8:
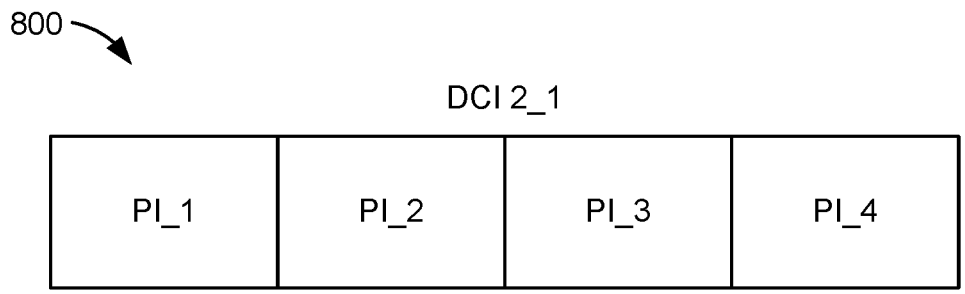
FIG. 8 illustrates a representation of an example downlink control indicator (DCI) under DCI format 2_1, according to aspects of the disclosure.

FIG. 8 is a diagram 800 of an example DCI under DCI format 2_1, where N=4. It is noted that DCI 2_1 is group common. However, the interpretation can be different for different UEs. This implies that each UE may read whatever information that pertains to that UE. For example:
   UE1: CC1→PI_1, CC2→PI_2, CC3→PI_4.
   UE2: CC1→PI_3.
   UE3: CC1→PI_1, CC2→PI_2.

Figure 9:
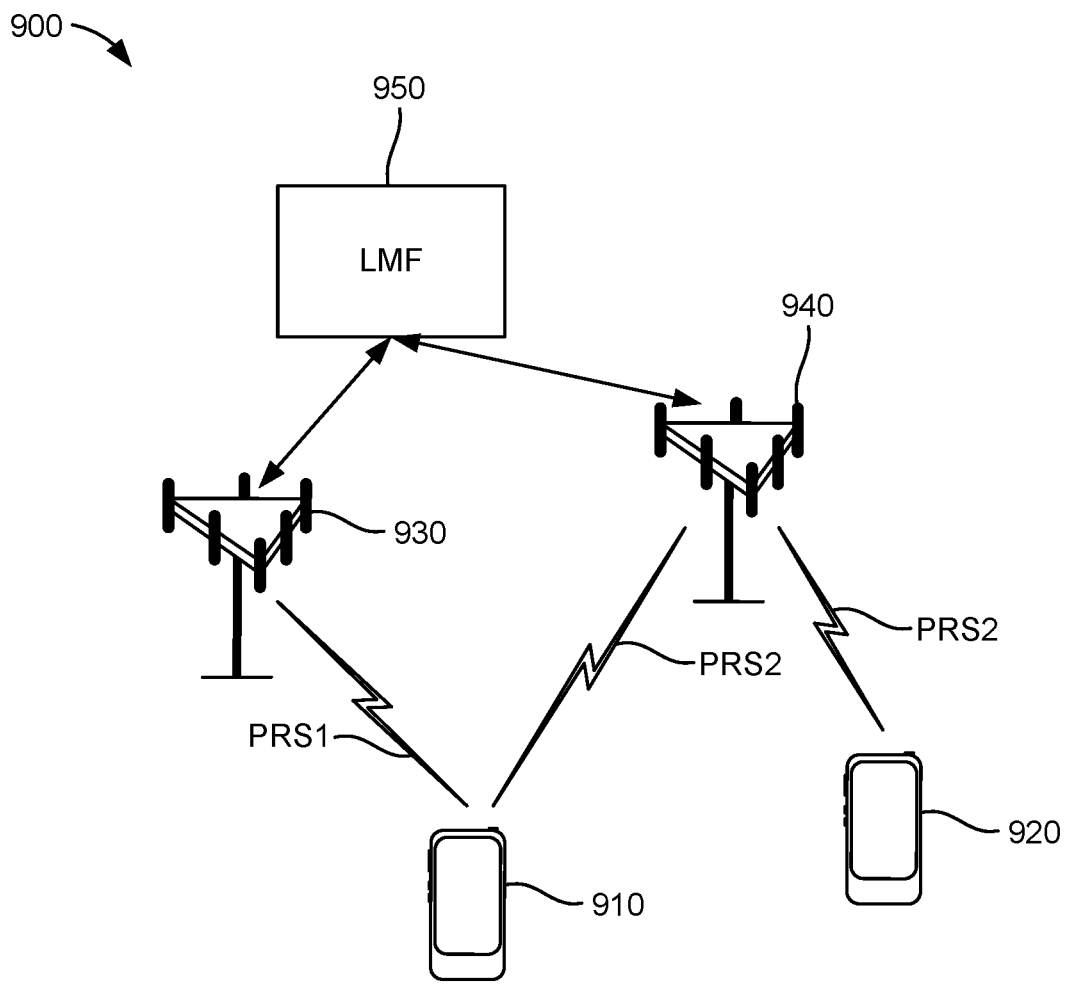
FIG. 9 illustrates an exemplary wireless communications system, according to aspects of the disclosure.

FIGS. 7A, 7B, and 7C illustrate situations in which transmission of data is preempted, i.e., data resources (e.g., PDSCH) may be punctured. However, reference signals (RS) can also be punctured. URLLC traffic should have priority compared to signals a UE receives either from a serving or neighboring cell. For example, URLLC traffic should take priority over receiving PRS on the downlink. FIG. 9 is a diagram 900 of an example scenario that includes a first UE 910, a second UE 920, a first gNB 930, a second gNB 940, and an LMF 950. In the scenario of FIG. 9, the following may be assumed:
   The first gNB 930 is serving the first UE 910. Hence, the first and second gNBs 930 and 940 may also respectively be referred to as serving and neighboring gNBs.
   The first UE 910 is receiving eMBB traffic from both the serving and neighboring gNBs 930 and 940. Hence, the first UE 910 may be referred to as eMBB UE 910.
   The neighboring gNB 940 needs to deliver URLLC data to the second UE 920. Hence, the second UE 920 may be referred to as URLLC UE 920.

A network entity, such as the LMF 950 or the serving gNB 930 may configure PRS resources for the UEs 910, 920, e.g., through one or more configuration messages (e.g., almanac messages). In an aspect, the network entity may also configure the gNBs 930, 940 so that gNBs 930, 940 know which resources are allowed to be punctured.

As seen, the serving gNB 930 may transmit first PRS signals labeled "PRS1" and the neighboring gNB 940 may transmit second PRS signals labeled "PRS2." The eMBB UE 910 may make positioning related measurements (e.g., OTDOA, RSTD, RTT, AoA, AoD, etc.) based on the "PRS1" and "PRS2" signals transmitted by the serving and neighboring gNBs 930, 940. However, when the neighboring gNB 940 wants to transmit the URLLC data, it may puncture some of the "PRS2" resources to deliver the URLLC data to the URLLC UE 920 to comply with the low latency standard of URLLC traffic.

Typically, it is unrealistic for a cell to directly contact a UE (e.g., through a downlink PI DCI) of another cell to inform the UE about the puncturing. That is, in the scenario of FIG. 9, it may be unrealistic for the neighboring gNB 940 to directly contact (e.g., through a downlink PI DCI) the eMBB UE 910 since the eMBB UE 910 is being served by another cell, i.e., by the serving gNB 930. The neighboring gNB 940 may inform the serving gNB 930—e.g., through higher layer signaling through the LMF 950—about the puncturing of the "PRS2" so that the serving gNB 930 can in turn notify the eMBB UE 910. However, this is likely to result in large latencies such that the information will no longer be useful when it is eventually received by the eMBB UE 910. For example, the cMBB UE 910 may have already performed the PRS processing on the entirety of the PRS resources including the punctured resources.

A caveat is that if the neighboring gNB 940 is one of the gNBs in a multi-TRP case, then it may be possible for the neighboring gNB 940 to directly contact the eMBB UE 910. In such instances, the neighboring gNB 940 may be able to contact the cMBB UE 910 using any of the approaches illustrated in FIGS. 7A, 7B, and 7C.

The present disclosure provides techniques in which the neighboring gNB 940 is able to notify the cMBB UE 910 without having to forward the PI to the serving gNB 930 through the LMF 950. In one or more aspects, it is proposed that the neighboring gNB 940 embed into the "PRS2" itself an indication of whether or not the "PRS2" is punctured. Since the indication is embedded in the "PRS2" itself, the eMBB UE 910 can be notified in a timely manner.

In the proposed approach, a UE may be configured via higher layer (e.g., layers above physical layer) regarding resources (frequency, time, and/or spatial (i.e., port) domain) of a reference signal (RS). The configuration may be received through RRC and/or MAC control element (CE) messages. For PRS, the configuration may also be received through LPP messages. The RS resources may be divided into "puncturable" and "unpuncturable" subsets. The puncturable subset may be the subset of the RS resources that are allowed to be punctured with other PHY signals (e.g., PHY channel carrying URLLC data or control information). However, the puncturable subset resources are not required to be punctured. Conversely, the unpuncturable subset may be the subset of the RS resources that are prohibited from being punctured. In other words, for the unpuncturable subset, the UE may assume that no puncturing will take place. In an aspect, the unpuncturable subset may comprise all remaining RS resources that are not in the puncturable subset.

The higher layer configuration may indicate which of the RS resources are in the puncturable subset and which are in the unpuncturable subset. If the RS resources are divided such that each resource is in one subset or the other, then only one subset may be indicated. To indicate which resources are puncturable/unpuncturable, the configuration may include puncturable and/or unpuncturable subset indication, in which each indication may include (not necessarily exhaustive):

- A puncturable (unpuncturable) frequency bitmap indicating one or more frequency domain resources (e.g., PRB indices, PRB group indices, etc.) of the puncturable (unpuncturable) subset;
- A puncturable (unpuncturable) time bitmap indicating one or more time domain resources (e.g., OFDM symbols, OFDM symbol regions, slots, subframes, frames, occasions if the RS is PRS, instances if the RS is PRS) of the puncturable (unpuncturable) subset; and/or
- A puncturable (unpuncturable) spatial bitmap indicating one or more spatial domain resources (e.g., ports) of the puncturable (unpuncturable) subset.

The higher layer configuration may also configure the UE to use the unpuncturable subset to identify whether or not the puncturable subset has in fact been punctured. Before proceeding further, the following should be noted. In the scenario of FIG. 9, it is assumed that the URLLC UE 920 is different from the eMBB UE 910. However, the two can be the same. That is, the intended destination for the URLLC data may be the cMBB UE 910. Nonetheless, the character of the ULRRC transmission can be significantly different. That is, when there is puncturing, the character of the puncturable subset (e.g., transmission power, phase, sequence, code, etc.) may be very different. Thus, even when the URLLC data is intended for the same UE, much of the proposed approaches and techniques may still be applicable.

Figure 10A:
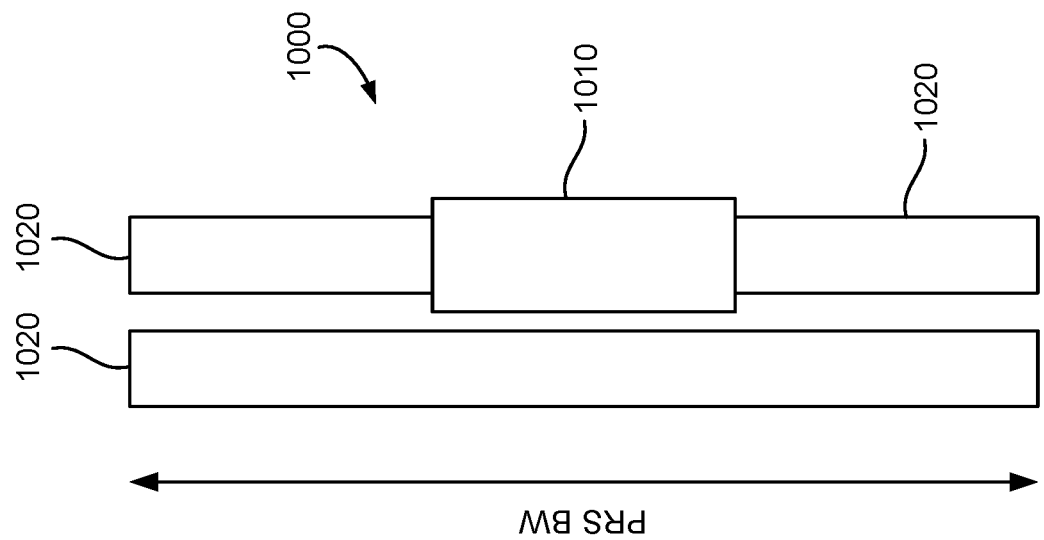
FIGS. 10A to 10E illustrate example configurations of reference signals (RS), according to aspects of the disclosure.

FIGS. 10A to 10E illustrate different examples of puncturable subset(s) 1010 and unpuncturable subset(s) 1020 of resources of an RS 1000. FIG. 10A illustrates an example way that resources of the (RS 1000 may be configured. In this example, it may be assumed that the RS 1000 is a PRS. In this instance, the RS 1000 resources are illustrated to comprise some bandwidth (e.g., PRBs, PRB groups, etc.) in the frequency domain and two symbols in the time domain. The RS resources may include puncturable subset 1010 and unpuncturable subset 1020. If there is no puncturing, i.e., the puncturable subset 1010 is not punctured by another PHY signal, then the UE may use all resources, i.e., resources of both the puncturable subset 1010 and the unpuncturable subset 1020, to make PRS related measurements (e.g., OTDOA, RSTD. RTT. AoA, AoD, etc.). However, if there is puncturing, i.e., the puncturable subset 1010 is punctured, then the UE may use only the unpuncturable subset 1020 to make the PRS related measurements. For example, the UE may zero out the LLRs of the puncturable subset 1010.

In an aspect, the higher layer configuration may indicate to the UE a plurality of scrambling identifiers (IDs) that apply to the configured RS 1000. For example, the higher layer configuration may configure the UE with a first scrambling ID and a second scrambling ID for the RS 1000. The first scrambling ID may correspond to the case where no puncturing has occurred, and the second scrambling ID may correspond to the case where puncturing has occurred. In other words, if a gNB punctures the puncturable subset 1010 (e.g., by a PHY signal carrying URLLC data or control information), then the gNB may scramble the transmitted PRS based on the first scrambling ID. On the other hand, if the gNB does not puncture the puncturable subset 1010, then the gNB may scramble the transmitted PRS based on the second scrambling ID. The $C_{init}$ formula for scrambling initialization at the start of each OFDM symbol is provided as follows:

$$C_{init}=(2^{16}(N_{symb}^{slot}n_{s,f}^{\mu}+l+1)(2N_{ID}+1)+N_{ID})\bmod 2^{31}$$

where $N_{symb}^{slot}$ represents the number of symbols per slot, $n_{s,f}^{\mu}$ represents the slot index within a frame for the numerology indicated by $\mu$, l represents the symbol index inside the slot. In the formula, two Nip can be provided to differentiate the first and second scrambling IDs. In an aspect, the entirety of the transmitted RS 1000—the puncturable and unpuncturable subsets 1010, 1020—maybe scrambled based on the first/second scrambling IDs.

During operation, when the UE receives a PRS from a gNB, the UE may apply the first and/or second scrambling IDs to the received PRS to determine whether the PRS was punctured or not. In an aspect, the first and/or the second scrambling IDs may be applied to the entirety of the received PRS, i.e., to both the puncturable and unpuncturable subsets 1010, 1020. As an illustration, the UE may determine first quality measurements (e.g., signal-to-noise ratio (SNR), SINR, error rate (ER), etc.) of the received PRS based on the first scrambling ID, and determine second quality measurements of the received PRS based on the second scrambling ID. If the first quality measurements are better (e.g., first SNR>second SNR, first SINR>second SINR, first ER>second ER, etc.), then the UE may determine that the PRS has not been punctured. Otherwise, the UE may determine that the PRS has been punctured.

Alternatively, a difference threshold may be applied to the quality measurements. For example, if SNR measurements are made, then "SNR_thresh" (e.g., in dB) may be defined. In this instance, if the first SNR is greater than the second SNR plus the "SNR_thresh," then the UE may determine that the PRS has not been punctured. On the other hand, if the second SNR is greater than the first SNR plus the "SNR_thresh," then the UE may determine that the PRS has been punctured. If the first and second SNRs are within "SNR_thresh" of each other, i.e., if the difference between the first SNR and the second SNR is less than the "SNR_thresh," then an error may be indicated.

In another aspect, the higher layer configuration may again indicate to the UE a plurality of scrambling IDs that apply to the configured RS 1000. But in this aspect, the higher layer configuration may configure the UE with three scrambling IDs—a u-scrambling ID (corresponding to the unpuncturable subset 1020), a first p-scrambling ID (corresponding to the puncturable subset 1020 when not punctured), and a second p-scrambling ID (corresponding to the puncturable subset 1020 when punctured).

During operation, when the UE receives a PRS from a gNB, the UE may apply the u-scrambling ID to the unpuncturable subset 1020. The UE may also apply the first and/or second p-scrambling IDs to the puncturable subset 1010 to determine whether the PRS was punctured or not. As an illustration, the UE may determine u-quality measurements (e.g., SNR, SINR, error rate, etc.) of the unpuncturable subset 1020 based on the u-scrambling ID, determine first p-quality measurements of the puncturable subset 1010 based on the first p-scrambling ID, and determine second p-quality measurements of the puncturable subset 1010 based on the second p-scrambling ID. If the first p-quality measurements are closer to the u-quality measurements (e.g., |first p-SNR−u-SNR|<|second p-SNR−u-SNR|, |first p-SINR−u-SINR|<|second p-SINR−u-SINR|. |first p-ER−u-ER|<|second p-ER−u-ER|, etc.), then the UE may determine that the PRS has not been punctured. Otherwise, the UE may determine that the PRS has not been punctured.

In an alternative, the first and second p-quality measurements themselves may be used without the u-quality measurements. For example, if first p-SNR is greater than second p-SNR, then the UE may determine that PRS has not been punctured. As a further alternative, a difference threshold may be applied.

Note that in a further aspect, instead of configuring the UE with three scrambling IDs, two scrambling IDs may be configured. In this aspect, the u-scrambling ID and the first p-scrambling ID may be one and the same. Thus, the two scrambling IDs may be referred to as u-scrambling ID (corresponding to the unpuncturable subset 1020 and to the puncturable subset 1010 when not punctured) and p-scrambling ID (corresponding to the puncturable subset 1020 when punctured). Further details are omitted for this aspect since it is straight forward to adopt the aspect described immediately above to this aspect.

In an aspect, the unpuncturable subset may be configured to observe one or more configuration thresholds. Such configuration thresholds may include any one or more of:

min_unpuncturable_ratio, which sets a lower limit for a ratio of the unpuncturable subset resources to all resources of the RS, i.e., the unpunctured_ratio of the configured RS must be min_unpunctured_ratio or greater;

min_PRB, which sets a lower limit for a number of PRBs for the unpuncturable subset, i.e., the number of PRBs in the unpuncturable subset must be min_PRB or more; and min_RE_symbol, min_RE_slot, min_RE_occasion, and/or min_RE_instance, which respectively set (not all need be set) minimum number of resource elements in a symbol, slot, occasion, or instance.

The unpuncturable subset 1020 may be configured so as to enhance performance and/or reduce complexity. For example, the unpuncturable subset 1020 may be configured to be larger than the puncturable subset 1010. That is, the min_unpuncturable_ratio may be set to be 50% or greater. In some instances, the min_unpuncturable_ratio may be set as high as 90% or more.

Figure 10B:
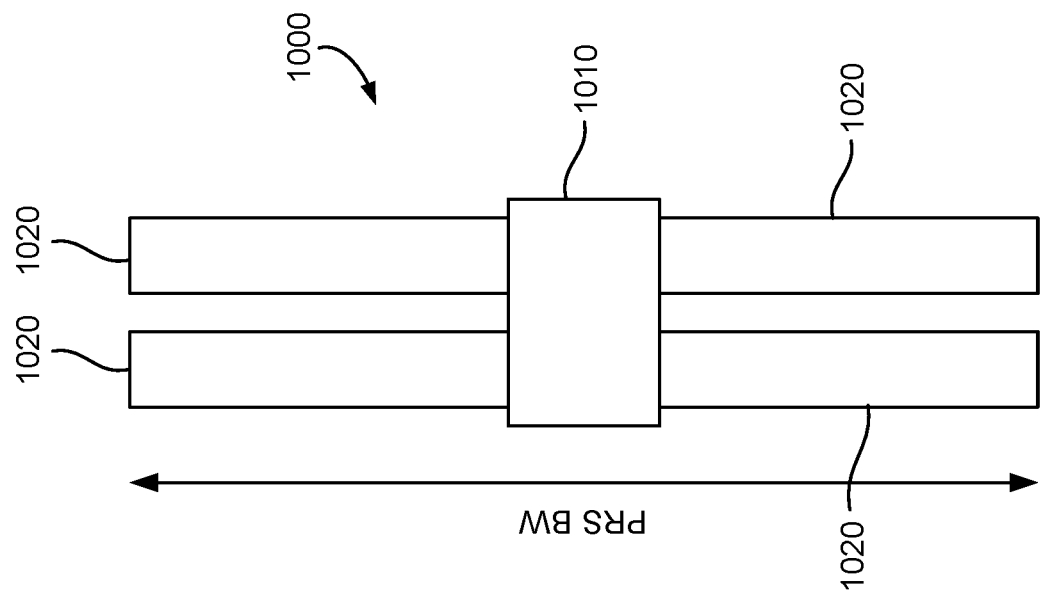

As another example, to the extent possible, the unpuncturable subset 1020 may be configured to be contiguous in time and/or in frequency. FIG. 10A illustrates an example in which the unpuncturable subset 1020 is contiguous in both time and frequency. FIG. 10B illustrates another example of how the resources of the RS 1000 may be configured. In FIG. 10B, the unpuncturable subset 1020 is not contiguous in frequency.

While the RS 1000 can be configured as illustrated in FIG. 10B, the configuration of FIG. 10A may provide better performance. Since the unpuncturable subset 1020 is contiguous in frequency in FIG. 10A, it may be sufficient for only one FFT to be performed per symbol. But in FIG. 10B, two FFS may need to be performed per symbol—one for the unpuncturable subset 1020 above the puncturable subset 1010, and another for the unpuncturable subset 1020 below the puncturable subset 1010. The simpler configuration of FIG. 10A is likely to result in better performance (e.g., more accuracy in the PRS related measurements) than the configuration of FIG. 10B.

The configuration of FIG. 10A is also advantageous in that it may allow a more accurate detection of the puncturable subset 1010. Since the unpuncturable subset 1020 is guaranteed to remain unpunctured, the UE may perform channel estimation based on the unpuncturable subset 1020. The UE then may use the channel estimation to detect whether the puncturable subset 1010 has indeed been punctured or not. Due to its simpler nature, the FIG. 10A configuration is likely to result in better channel estimation, which in turn is likely to result in more accurate quality measurements (e.g., SNR, SINR, error rate, etc.) of the puncturable subset 1010.

Figure 10C:
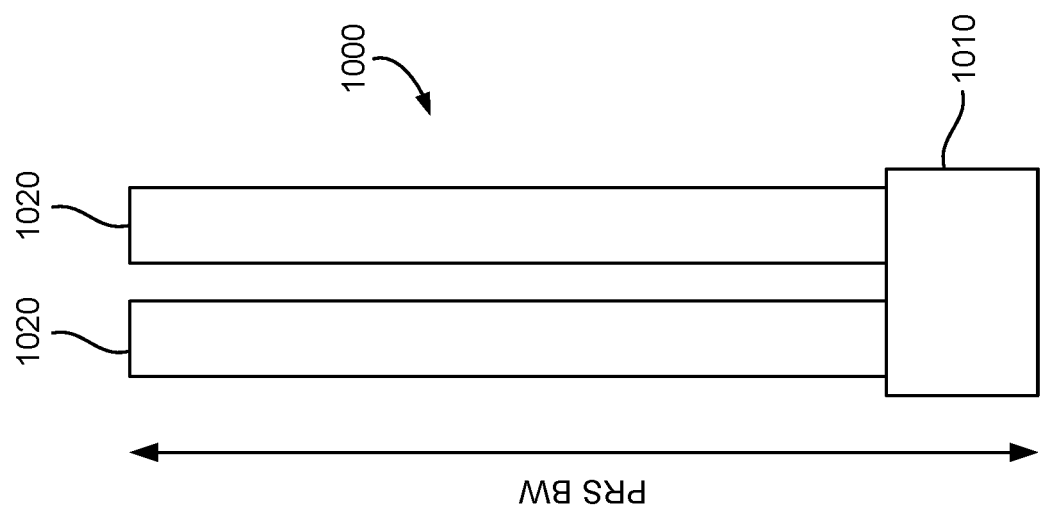

FIG. 10C illustrates yet another example of how resources of the RS 1000 may be configured. FIG. 10C illustrates an example configuration in which the unpuncturable subset 1020 comprises an entire bandwidth of the RS 1000 for one or more symbols. More generically, the unpuncturable subset 1020 may comprise an entire bandwidth of the RS 1000 at least for some time duration (e.g., symbols, slots, subframes, etc.). In FIG. 10C, the unpuncturable subset 1020 is illustrated as comprising an entire bandwidth of the RS 1000 for the duration of the first symbol. This means that the UE will be able to use the entire bandwidth of the RS 1000 during the first symbol to perform channel estimation.

The puncturable subset 1010 may also be configured. In an aspect, the puncturable subset 1010 may be configured as a two-dimensional block in time and frequency dimensions. The puncturable subset 1010 may be contiguous in the frequency domain, the time domain, or in both domains. For example, if the PRS is four symbols long and if the first and third symbols are puncturable, then it may be preferred that the second symbol also be puncturable. That is, having an unpuncturable symbol in between puncturable symbols should generally be avoided.

As indicated above, the UE may receive the higher layer configuration information through any one or more of RRC, MAC CE, and LPP (for PRS). Using scrambling IDs to indicate whether the puncturable subset 1010 is actually punctured or not may be viewed as being an example of an implicit indication.

However, if the RS resources are transmitted by the serving gNB, then the UE may be explicitly notified through a PI DCI that applies to the RS resource. The PI DCI may specify the puncturable subset. The puncturable subset specified in the PI DCI need not adhere to the puncturable subset configured through the higher layer signaling. That is, the PI DCI may define its own independent puncturable subset, and there would be no need for an implicit indication through the scrambling code. For example, it may be allowed that the puncturable subset can be the whole RS resource. The PI DCI may be received within a maximum time-domain distance from the punctured RS—e.g., number of symbols, slots, same occasion, same subframe, same frame, same instance—from the RS resource that was punctured. In an aspect, the UE may indicate its capability of whether it can receive a PI DCI, and indicate its maximum time distance.

It is of course contemplated that if the higher layer configured RS is sufficient, the serving gNB may use the implicit indication through scrambling IDs as described.

Figure 10E:
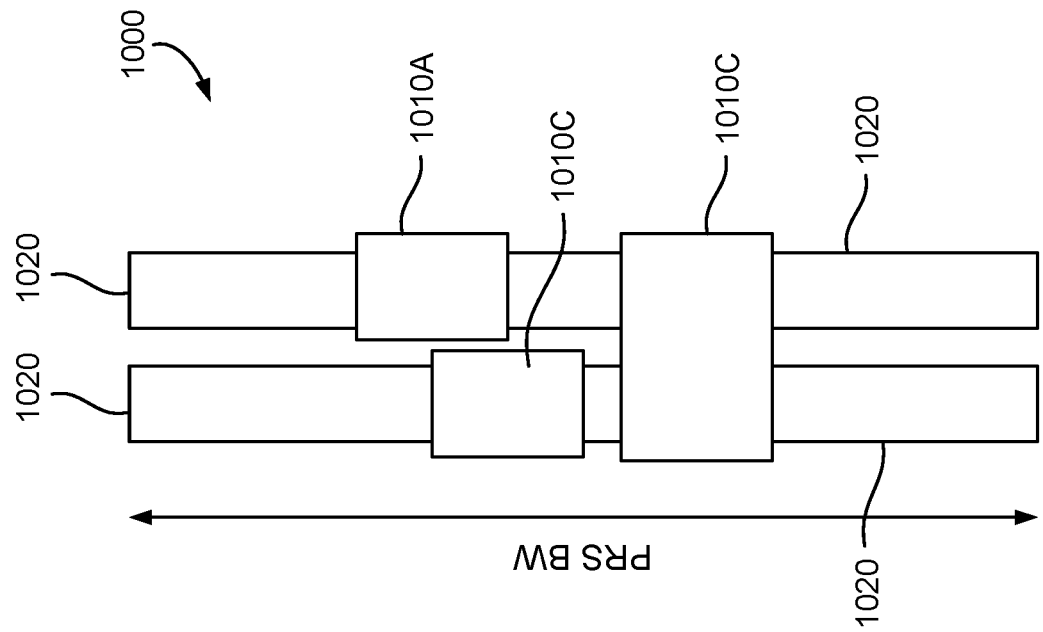
Figure 10D:
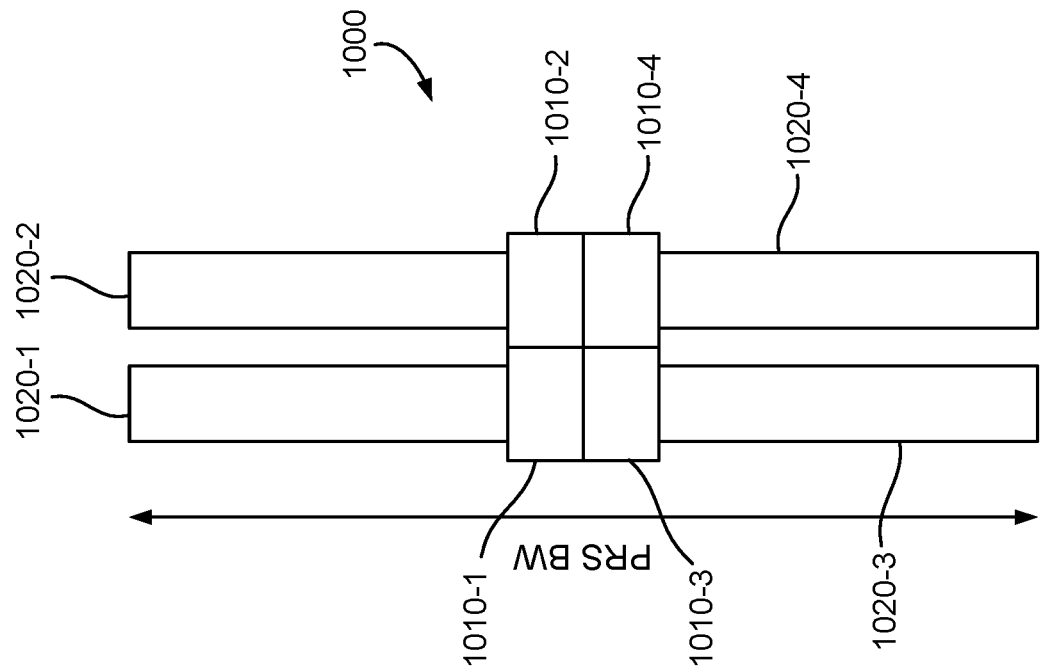

FIG. 10D illustrates a further example of how resources of the RS 1000 may be configured. In particular, FIG. 10D illustrates a technique to embed multiple bits in the unpuncturable subset 1020. In FIG. 10D, the puncturable subset 1010 may comprise a plurality of puncturable subset regions 1010-$k$ (where k=1 to n) and the unpuncturable subset 1020 may comprise associated plurality of unpuncturable subset regions 1020-$k$ (where k=1 to n). In FIG. 10, n=4. For each unpuncturable subset region 1010-$k$, a flag (e.g., one bit) may be embedded, e.g., in an OFDM pilot sequence, in the associated unpuncturable subset region 1020-$k$ indicating whether the associated puncturable subset region 1010-$k$ is actually punctured or not. Any constraints on the length of the unpuncturable subset 1020 may be defined for each region separately so as to ensure that the UE may detect the correct sequence.

FIG. 10E illustrates yet a further example of how resources of the RS 1000 may be configured. In an aspect a plurality of puncturable subsets may be configured. FIG. 10E illustrates an example in which three puncturable subsets 1010A, 1010B, and 1010C are configured. Each puncturable subset 1010 may be contiguous in time and/or in frequency. However, the puncturable subsets 1010 themselves need not be contiguous with each other.

In this instance, multiple scrambling IDs may be configured. For example, two scrambling IDs may be configured for each puncturable subset 1010—one to indicate punctured and one to indicate not punctured. In further detail, the scrambling IDs may include a u-scrambling ID corresponding to the unpuncturable subset 1020. The scrambling IDs may also include, for each puncturable subset 1010, first and second p-scrambling IDs. The u-scrambling ID and the first and second p-scrambling IDs of each puncturable subset 1010 may be applied similarly to the manner when three scrambling IDs (e.g., u-scrambling ID, first p-scrambling ID, second p-scrambling ID) are applied with respect to FIG. 10A described above.

Alternatively, the number of scrambling IDs may be minimized by configuring a u-scrambling ID common to all puncturable subsets 1010 to be used when the puncturable subset 1010 is not puntured, and separate p-scrambling IDs for each puncturable subset. In this alternative, the u-scrambling ID and the p-scrambling ID of each puncturable subset 1010 may be applied similarly to the manner in which the two scrambling IDs (e.g., u-scrambling ID, p-scrambling ID) are applied with respect to FIG. 10A described above.

Figure 11:
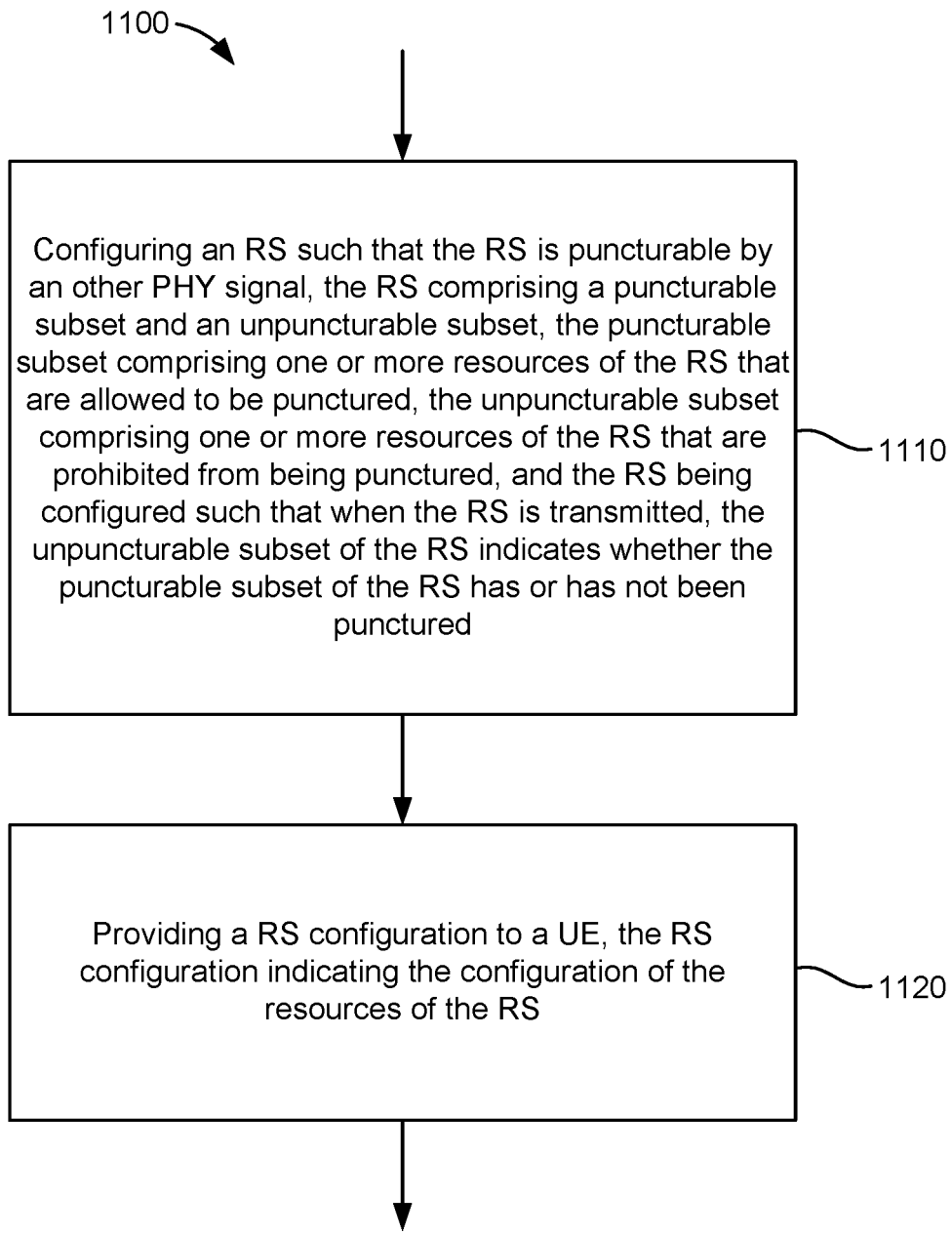
FIG. 11 illustrates a flowchart of an exemplary method of a network entity, according to aspects of the disclosure.

FIG. 11 illustrates a flowchart of an exemplary method 1100 of a network entity (e.g., location server, LMF, base station, etc.).

In block 1110, the network entity may configure an RS. In an aspect, where the network entity is a base station, block 1110 may be performed by WWAN transceiver 350, processing system 384, memory component 386, and/or puncturing component 388, any or all of which may be considered means for performing this block. Where the network entity is a location server, block 1110 may be performed by network interface(s) 390, processing system 394, memory component 396, and/or puncturing component 398, any or all of which may be considered means for performing this block.

The RS may be configured such that the RS is puncturable by another physical layer (PHY) signal that has higher priority than the RS. For example, PHY channel carrying URLLC data or control information may have priority over the RS. The RS may be a (PRS, CRS, CSI-RS, SSB, TRS, etc. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The RS may be configured such that when the RS is transmitted, the unpuncturable subset of the RS indicates whether the puncturable subset of the RS has or has not been punctured.

In block 1120, the network entity may provide an RS configuration to a UE (e.g., any of the UEs described herein). The RS configuration may indicate the configuration of resources of the RS. In an aspect, where the network entity is a base station, block 1120 may be performed by WWAN transceiver 350, processing system 384, memory component 386, and/or puncturing component 388, any or all of which may be considered means for performing this block. Where the network entity is a location server, block 1120 may be performed by network interface(s) 390, processing system 394, memory component 396, and/or puncturing component 398, any or all of which may be considered means for performing this block.

The RS configuration may be provided in a higher layer signaling (e.g., layers above the physical layer) messages such as RRC messages, MAC CE messages, LPP messages, or any combination thereof. RS configuration may include puncturable and/or unpuncturable subset indications. The puncturable subset indication may indicate the resources of the puncturable subset, and the unpuncturable subset indication may indicate the resources of the unpuncturable subset.

In an aspect, the RS configuration may comprise a plurality of scrambling IDs including first and second scrambling IDs. When the puncturable subset of the RS is punctured, the RS may be scrambled based on the first scrambling ID. When the puncturable subset of the RS is not punctured, the RS may be scrambled based on the second scrambling ID.

In an aspect, the RS configuration may comprise a plurality of scrambling IDs including a u-scrambling ID and first and second p-scrambling IDs. The unpuncturable subset may be scrambled based on the u-scrambling ID. When the puncturable subset of the RS is punctured, the puncturable subset of the RS may be scrambled based on the first p-scrambling ID. When the puncturable subset of the RS is not punctured, the puncturable subset of the RS may be scrambled based on the second p-scrambling ID.

In an aspect, the RS configuration may comprise a plurality of scrambling IDs including a u-scrambling ID and a p-scrambling ID. The unpuncturable subset may be scrambled based on the u-scrambling ID. When the puncturable subset of the RS is punctured, the puncturable subset of the RS may be scrambled based on the p-scrambling ID. When the puncturable subset of the RS is not punctured, the puncturable subset of the RS may be scrambled based on the u-scrambling ID.

In an aspect, the puncturable subset may comprise a plurality of puncturable subset regions, and the unpuncturable subset may comprise a plurality of unpuncturable subset regions associated with the plurality of puncturable subset regions. Also, a flag (e.g., a bit) may be embedded in each unpuncturable subset region of the RS to indicate whether or not each associated puncturable subset region of the RS has been punctured. For each unpuncturable subset region of the RS, the flag may be embedded in an OFDM pilot sequence of that unpuncturable subset region.

In an aspect, the RS may be configured to comprise a plurality of puncturable subsets, and the RS configuration may comprise a plurality of scrambling IDs including a u-scrambling ID, and first and second p-scrambling IDs for each puncturable subset. The unpuncturable subset of the RS may be scrambled based on the u-scrambling ID. For each puncturable subset of the RS, when that puncturable subset is punctured, that puncturable subset may be scrambled based on the first p-scrambling ID of that puncturable subset. For each puncturable subset of the RS, when that puncturable subset is not punctured, that puncturable subset may be scrambled based on the second p-scrambling ID of that puncturable subset.

In an aspect, the RS may be configured to comprise a plurality of puncturable subsets, and the RS configuration may comprise a plurality of scrambling IDs including a u-scrambling ID, and a p-scrambling ID for each puncturable subset. The unpuncturable subset of the RS may be scrambled based on the u-scrambling ID. For each puncturable subset of the RS, when that puncturable subset is punctured, that puncturable subset may be scrambled based on the p-scrambling ID of that puncturable subset. For each puncturable subset of the RS, when that puncturable subset is not punctured, that puncturable subset may be scrambled based on the u-scrambling ID.

Figure 12:
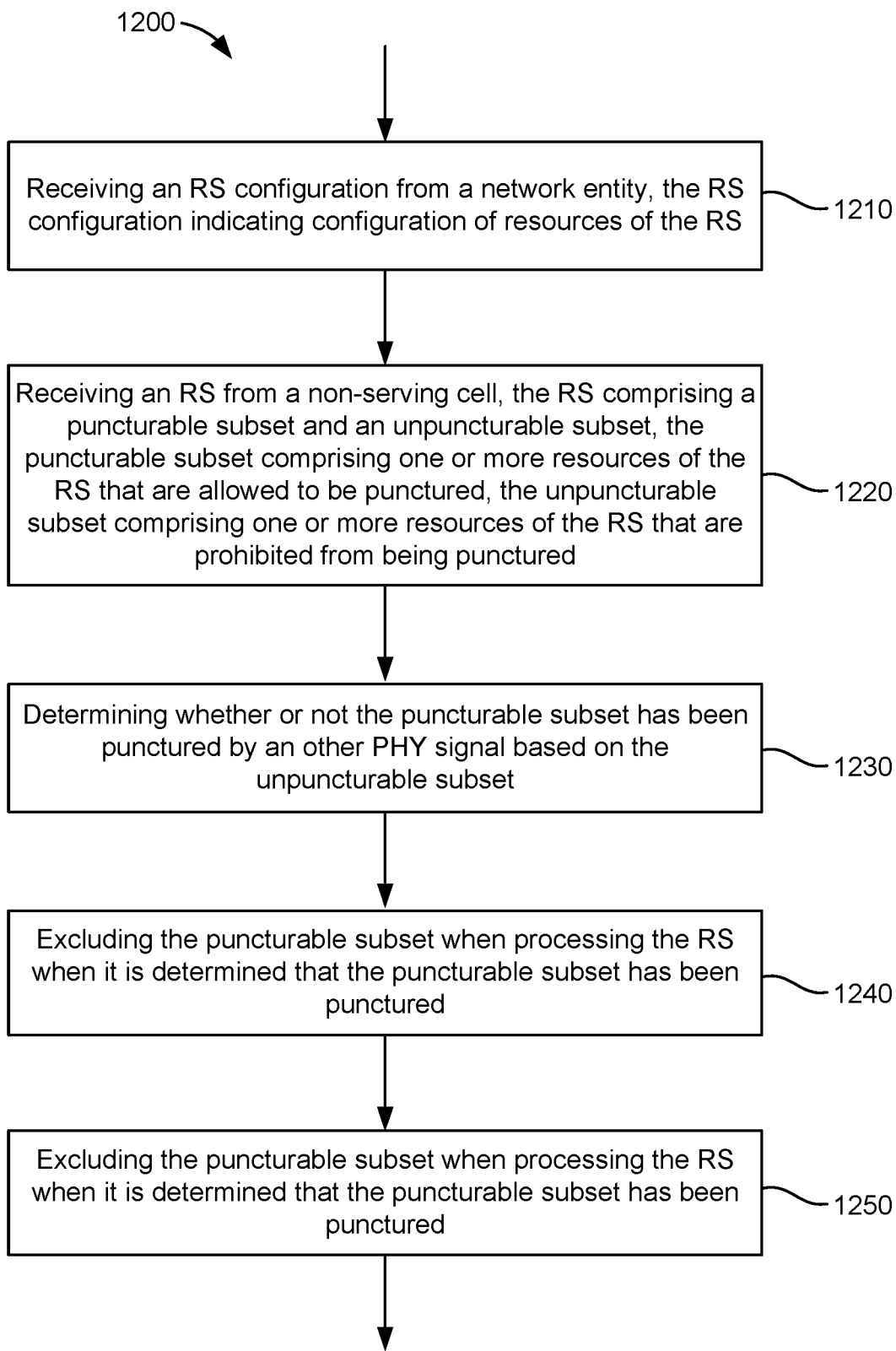
FIGS. 12 to 17 illustrate flowcharts of an exemplary method of a UE, according to aspects of the disclosure.

FIG. 12 illustrates a flowchart of an exemplary method 1200 of a UE (e.g., any of the UEs described herein).

In block 1210, the UE may receive an RS configuration from a network entity (e.g., location server, LMF, base station, etc.). The RS configuration may be received through a higher layer signaling and may indicate configuration of resources of the RS. In an aspect, block 1210 may be performed by WWAN transceiver 310, processing system 332, memory component 340, and/or puncturing component 342, any or all of which may be considered means for performing this block.

In block 1220, the UE may receive an RS from a non-serving cell. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. In an aspect, block 1220 may be performed by WWAN transceiver 310, processing system 332, memory component 340, and/or puncturing component 342, any or all of which may be considered means for performing this block.

In block 1230, the UE may determine whether or not the puncturable subset has been punctured by another PHY signal based on the unpuncturable subset. In an aspect, block 1230 may be performed by WWAN transceiver 310, processing system 332, memory component 340, and/or puncturing component 342, any or all of which may be considered means for performing this block.

Figure 13:
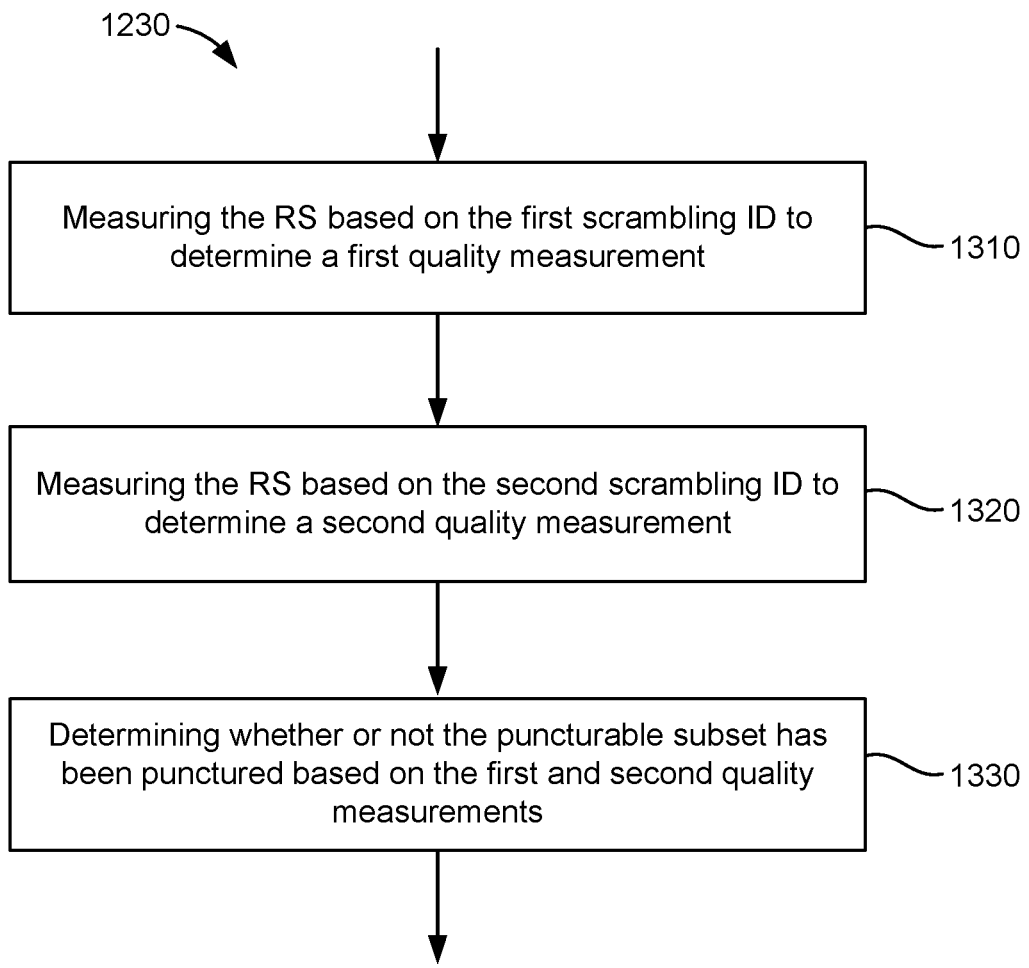

FIG. 13 illustrates a flow chart of an example process to implement block 1230. In an aspect, the RS configuration may include a plurality of scrambling IDs including first and second scrambling IDs.

In block 1310, the UE may measure the RS based on the first scrambling ID to determine a first quality measurement. The first quality measurement may include first SNR, first SINR, first error rate, etc.

In block 1320, the UE may measure the RS based on the second scrambling ID to determine a second quality measurement. The second quality measurement may include second SNR, second SINR, second error rate, etc.

In block 1330, the UE may determine whether or not the puncturable subset has been punctured based on the first and second quality measurements. For example, the UE may determine that the puncturable subset has been punctured (has not been punctured) when the first SNR is greater (less) than the second SNR, when the first when SINR is greater (less) than the second SINR, when the first error rate is less (greater) than the second error rate, etc.

Figure 14:
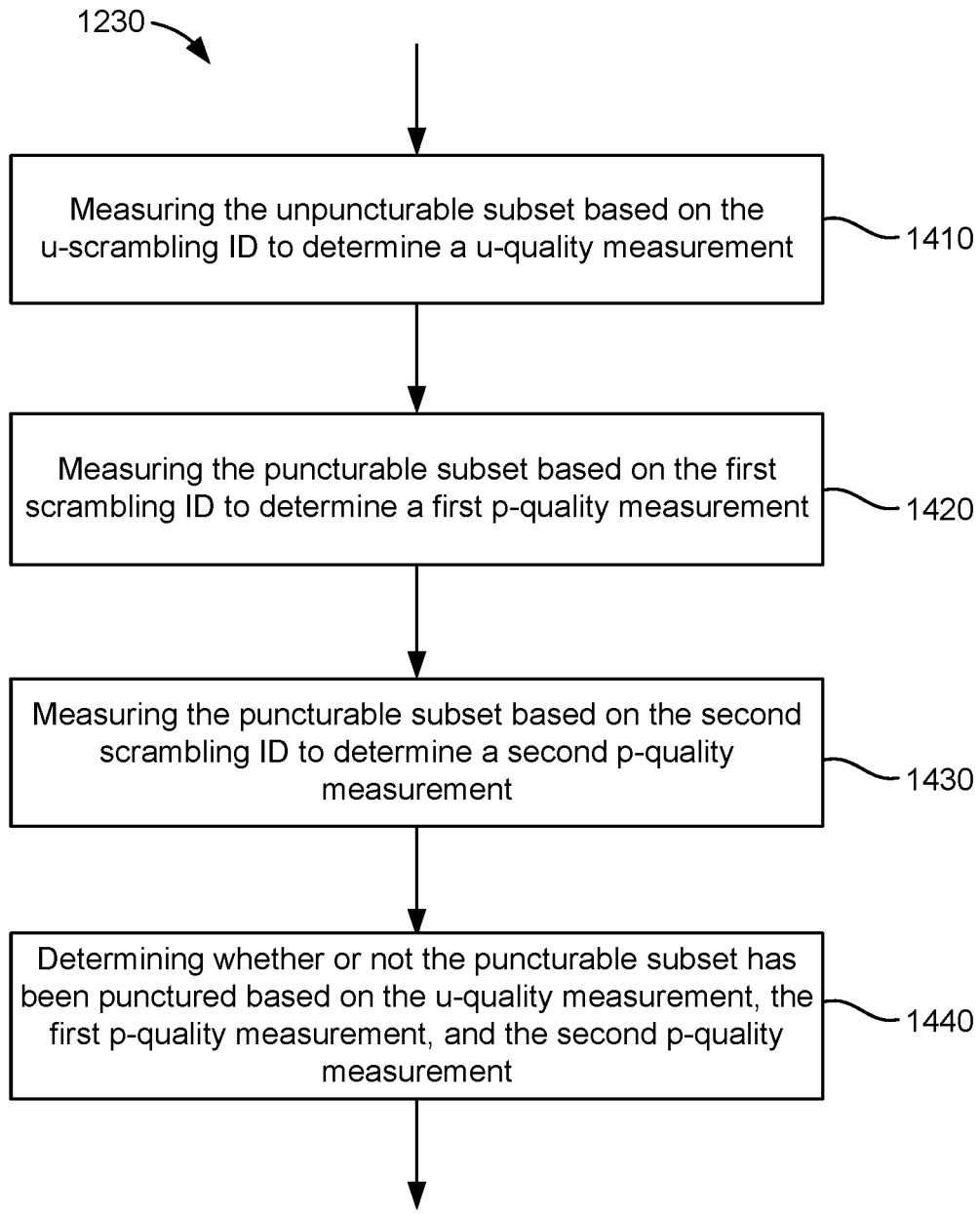

FIG. 14 illustrates a flow chart of another example process to implement block 1230. In this aspect, the RS configuration may include a plurality of scrambling IDs including a u-scrambling ID and first and second p-scrambling IDs.

In block 1410, the UE may measure the unpuncturable subset based on u-scrambling ID to determine a u-quality measurement. The u-quality measurement may include u-SNR, u-SINR, u-error rate, etc.

In block 1420, the UE may measure the puncturable subset based on the first p-scrambling ID to determine a first p-quality measurement. The first p-quality measurement may include first p-SNR, first p-SINR, first p-error rate, etc.

In block 1430, the UE may measure the puncturable subset based on the second p-scrambling ID to determine a second p-quality measurement. The second p-quality measurement may include second p-SNR, second p-SINR, second p-error rate, etc.

In block 1440, the UE may determine whether or not the puncturable subset has been punctured based on the u-quality measurement and the first and second p-quality measurements. In block 1440, the UE may determine that the puncturable subset has been punctured (has not been punctured) when a first SNR difference is less (greater) than a second SNR difference, when a first SINR difference is less (greater) than a second SINR difference, when a first error rate difference is greater (less) than a second error rate difference, etc. The first and second SNR differences may respectively be differences between the u-SNR and the first and second SNRs. The first and second SINR differences may respectively be differences between the u-SINR and the first and second SINRs. The first and second error rate differences may respectively be differences between the u-error rate and the first and second error rates.

When there are multiple puncturable subsets, the plurality of scrambling IDs may include first and second p-scrambling IDs for each puncturable subset, and the process illustrated in FIG. 14 may be adapted relatively straight forward. Thus, further details are omitted.

Figure 15:
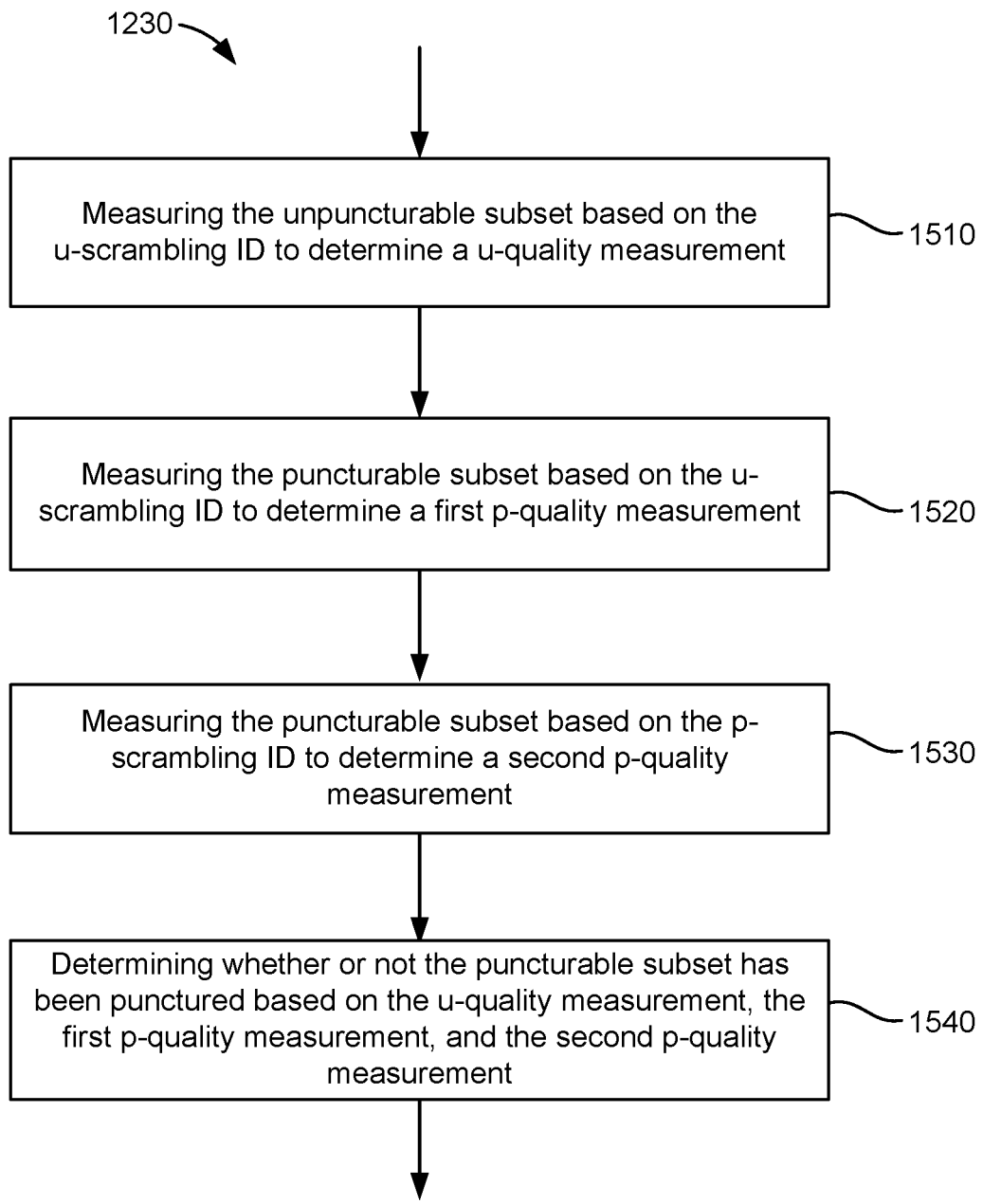

FIG. 15 illustrates a flow chart of another example process to implement block 1230. In this aspect, the RS configuration may include a plurality of scrambling IDs including a u-scrambling ID and a p-scrambling ID.

In block 1510, the UE may measure the unpuncturable subset based on u-scrambling ID to determine a u-quality measurement. The u-quality measurement may include u-SNR, u-SINR, u-error rate, etc.

In block 1520, the UE may measure the puncturable subset based on the u-scrambling ID to determine a first p-quality measurement. The first p-quality measurement may include first p-SNR, first p-SINR, first p-error rate, etc.

In block 1530, the UE may measure the puncturable subset based on the p-scrambling ID to determine a second p-quality measurement. The second p-quality measurement may include second p-SNR, second p-SINR, second p-error rate, etc.

In block 1540, the UE may determine whether or not the puncturable subset has been punctured based on the u-quality measurement and the first and second p-quality measurements. In block 1540, the UE may determine that the puncturable subset has been punctured (has not been punctured) when a first SNR difference is less (greater) than a second SNR difference, when a first SINR difference is less (greater) than a second SINR difference, when a first error rate difference is greater (less) than a second error rate difference, etc. The first and second SNR differences may respectively be differences between the u-SNR and the first and second SNRs. The first and second SINR differences may respectively be differences between the u-SINR and the first and second SINRs. The first and second error rate differences may respectively be differences between the u-error rate and the first and second error rates.

When there are multiple puncturable subsets, the plurality of scrambling IDs may include p-scrambling IDs for each puncturable subset, and the process illustrated in FIG. 15 may be adapted relatively straight forward. Thus, further details are omitted.

Figure 16:
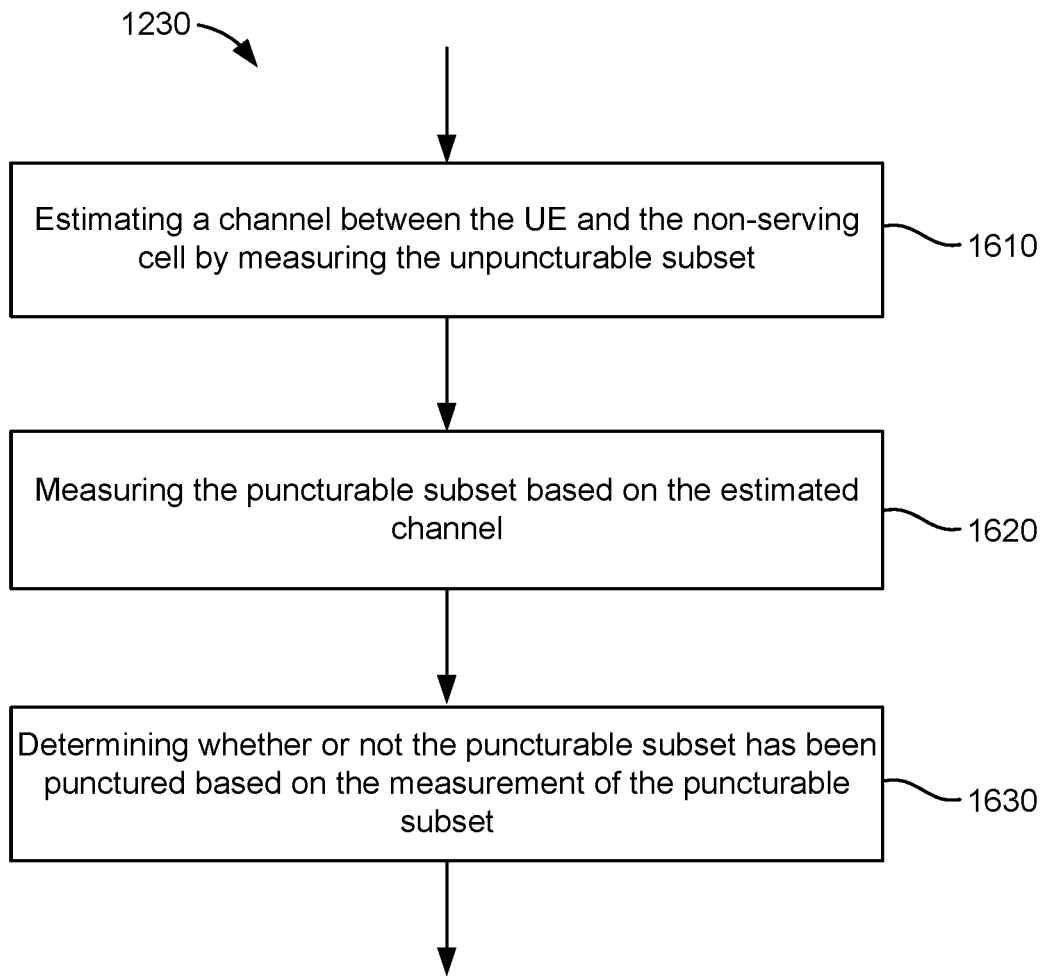

FIG. 16 illustrates a flow chart of another example process to implement block 1230.

In block 1610, the UE may estimate a channel between the UE and the non-serving cell by measuring the unpuncturable subset.

In block 1620, the UE may measure the puncturable subset based on the estimated channel.

In block 1630, the UE may whether or not the puncturable subset has been punctured based on the measurement of the puncturable subset.

Figure 17:
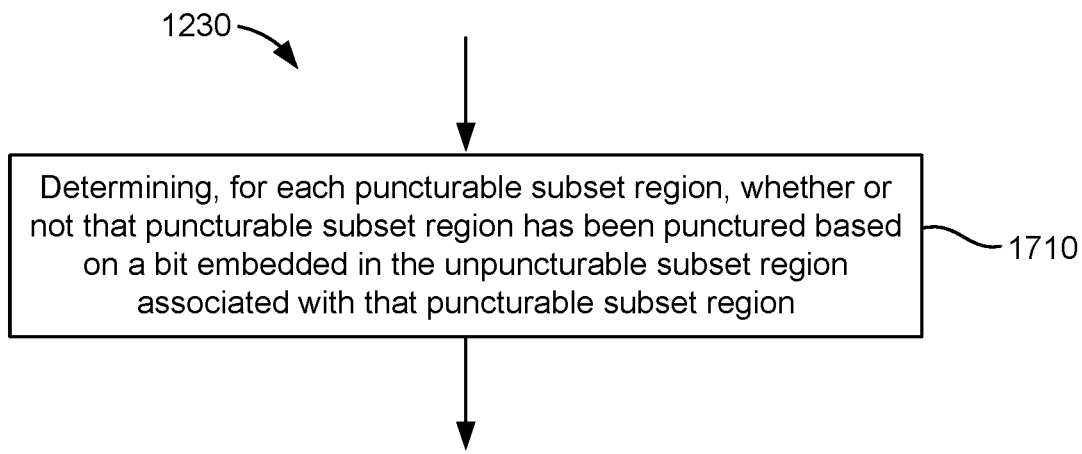

FIG. 17 illustrates a flow chart of another example process to implement block 1230. In this aspect, the puncturable subset may comprise a plurality of puncturable subset regions, and the unpuncturable subset may comprise a plurality of unpuncturable subset regions associated with the plurality of puncturable subset regions.

In block 1710, the UE may determine, for each puncturable subset region, whether or not that puncturable subset region has been punctured based on a flag (e.g., a bit) embedded in the unpuncturable subset region associated with that puncturable subset region.

Referring back to FIG. 12, in block 1240, the UE may exclude the puncturable subset when processing the RS when it is determined that the puncturable subset has been punctured. In an aspect, block 1240 may be performed by WWAN transceiver 310, processing system 332, memory component 340, and/or puncturing component 342, any or all of which may be considered means for performing this block.

In block 1250, the UE may include the puncturable subset when processing the RS when it is determined that the puncturable subset has not been punctured. In an aspect, block 1250 may be performed by WWAN transceiver 310, processing system 332, memory component 340, and/or puncturing component 342, any or all of which may be considered means for performing this block.

In an aspect, regardless of whether the puncturable subset is excluded (as in block 1240) or included (as in block 1250) when the RS is processed, information from the RS processing may be used to determine the position of the UE. The UE position may be determined by the UE itself (e.g., UE-based). Alternatively or in addition thereto, the UE may provide the processed RS information to the network (e.g., to the LMF, serving base station, etc.) so that the network can determine the UE position (i.e., UE-assisted). The position may be determined based on any one or more of RTT, OTDOA, AoA, AoD, etc.

Figure 18:
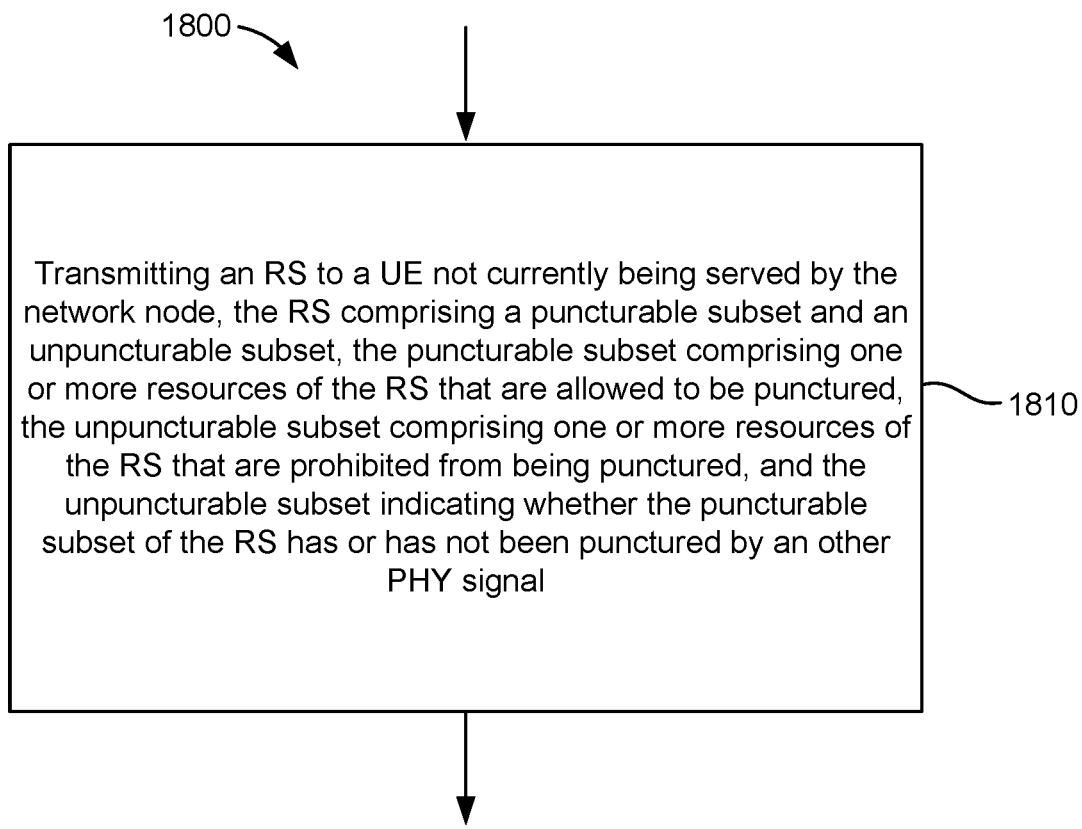
FIG. 18 illustrates a flowchart of an exemplary method of a network node, according to aspects of the disclosure.

FIG. 18 illustrates a flowchart of an exemplary method 1800 of a network node (e.g., cell, base station, gNB, etc.).

In block 1810, the network node may transmit an RS to a UE (e.g., any of the UEs described herein). In an aspect, where the network nide is a base station, block 1810 may be performed by WWAN transceiver 350, processing system 384, memory component 386, and/or puncturing component 388, any or all of which may be considered means for performing this block.

In this aspect, it may be that the UE is not currently being served by the network node. The RS may comprise a puncturable subset and an unpuncturable subset. The puncturable subset may comprise one or more resources of the RS that are allowed to be punctured, and the unpuncturable subset may comprise one or more resources of the RS that are prohibited from being punctured. The unpuncturable subset may indicate whether the puncturable subset of the RS has or has not been punctured, e.g., by another PHY signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a transceiver;
a memory; and
a processor communicatively coupled to the transceiver and the memory, wherein the processor is configured to:
receive, via the transceiver, a reference signal (RS) from a non-serving cell, the RS comprising a puncturable subset and an unpuncturable subset, the puncturable subset comprising one or more resources of the RS that are allowed to be punctured, the unpuncturable subset comprising one or more resources of the RS that are prohibited from being punctured;
estimate a channel between the UE and the non-serving cell based on a measurement of the unpuncturable subset;
obtain a measurement of the puncturable subset based on the estimated channel;
determine whether or not the puncturable subset has been punctured by another physical layer signal based on the measurement of the puncturable subset;
exclude the puncturable subset when processing the RS when it is determined that the puncturable subset has been punctured; and
include the puncturable subset when processing the RS when it is determined that the puncturable subset has not been punctured.

2. The UE of claim 1, wherein the other physical layer signal is a physical layer channel carrying higher priority information.

3. The UE of claim 2, wherein the higher priority information comprises ultra-reliable low-latency communication (URLLC) data or control information.

4. The UE of claim 1, wherein the processor is further configured to:
receive, via the transceiver, an RS configuration from a network entity, the RS configuration indicating a configuration of resources of the RS.

5. The UE of claim 4, wherein the RS configuration is received through higher layer signaling, the higher layer signaling being signaling through one or more layers above a physical layer.

6. The UE of claim 5, wherein the RS configuration is received through one or more radio resource control (RRC) messages, one or more media access control (MAC) control element (CE) messages, one or more Long Term Evolution (LTE) positioning protocol (LPP) messages, or any combination thereof.

7. The UE of claim 4, wherein the RS configuration comprises:
a puncturable subset indication indicating the resources of the puncturable subset,
an unpuncturable subset indication indicating the resources of the unpuncturable subset, or both.

8. The UE of claim 7,
wherein when included in the RS configuration, the puncturable subset indication comprises:
a puncturable frequency bitmap indicating one or more frequency domain resources of the puncturable subset,
a puncturable time bitmap indicating one or more time domain resources of the puncturable subset,
a puncturable spatial bitmap indicating one or more spatial domain resources of the puncturable subset, or
any combination thereof, and
wherein when included in the RS configuration, the unpuncturable subset indication comprises:
an unpuncturable frequency bitmap indicating one or more frequency domain resources of the unpuncturable subset,
an unpuncturable time bitmap indicating one or more time domain resources of the unpuncturable subset,
an unpuncturable spatial bitmap indicating one or more spatial domain resources of the unpuncturable subset, or
any combination thereof.

9. The UE of claim 4, wherein the RS is configured such that the unpuncturable subset is contiguous in time, and/or frequency, or both.

10. The UE of claim 4, wherein the RS is configured such that for at least one symbol duration, the unpunctured subset comprises an entire bandwidth of the RS for the at least one symbol duration.

11. The UE of claim 4,
wherein the RS is configured such that the puncturable subset comprises a plurality of puncturable subset regions, and the unpuncturable subset comprises a plurality of unpuncturable subset regions associated with the plurality of puncturable subset regions, and
wherein the processor is configured to determine, for each puncturable subset region, whether or not the puncturable subset region has been punctured based on a flag embedded in the unpuncturable subset region associated with that puncturable subset region.

12. A network entity, comprising:
a transceiver;
a memory; and
a processor communicatively coupled to the transceiver and the memory, wherein the processor is configured to:
configure a reference signal (RS) such that the RS is puncturable by another physical layer signal, the RS comprising a puncturable subset and an unpuncturable subset, the puncturable subset comprising one or more resources of the RS that are allowed to be punctured, the unpuncturable subset comprising one or more resources of the RS that are prohibited from being punctured, and the RS being configured such that when the RS is transmitted, the unpuncturable subset of the RS indicates whether the puncturable subset of the RS has or has not been punctured; and
provide an RS configuration to a user equipment (UE), the RS configuration indicating a configuration of resources of the RS,
wherein the RS is configured such that the puncturable subset comprises a plurality of puncturable subset regions, and the unpuncturable subset comprises a plurality of unpuncturable subset regions associated with the plurality of puncturable subset regions, and
wherein a flag is embedded in each unpuncturable subset region of the RS to indicate whether or not each associated puncturable subset region of the RS has been punctured.

13. The network entity of claim 12, wherein the RS is a positioning reference signal (PRS).

14. The network entity of claim 12, wherein the other physical layer signal is a physical layer channel carrying higher priority information.

15. The network entity of claim 14, wherein the higher priority information comprises ultra-reliable low-latency communication (URLLC) data or control information.

16. The network entity of claim 12, wherein the RS configuration is provided to the UE through higher layer signaling, the higher layer signaling being signaling through one or more layers above a physical layer.

17. The network entity of claim 16, wherein the RS configuration is provided to the UE through one or more radio resource control (RRC) messages, one or more media access control (MAC) control element (CE) messages, one or more Long Term Evolution (LTE) positioning protocol (LPP) messages, or any combination thereof.

18. The network entity of claim 12, wherein the RS configuration comprises:
a puncturable subset indication indicating the resources of the puncturable subset,
an unpuncturable subset indication indicating the resources of the unpuncturable subset, or both.

19. The network entity of claim 18,
wherein when included in the RS configuration, the puncturable subset indication comprises:
a puncturable frequency bitmap indicating one or more frequency domain resources of the puncturable subset,
a puncturable time bitmap indicating one or more time domain resources of the puncturable subset,
a puncturable spatial bitmap indicating one or more spatial domain resources of the puncturable subset, or
any combination thereof, and
wherein when included in the RS configuration, the unpuncturable subset indication comprises:
an unpuncturable frequency bitmap indicating one or more frequency domain resources of the unpuncturable subset,
an unpuncturable time bitmap indicating one or more time domain resources of the unpuncturable subset,
an unpuncturable spatial bitmap indicating one or more spatial domain resources of the unpuncturable subset, or
any combination thereof.

20. The network entity of claim 12, wherein the RS is configured such that the puncturable subset is contiguous in time, frequency, or both.

21. The network entity of claim 12, wherein the RS is configured such that the unpuncturable subset is contiguous in time, frequency, or both.

22. The network entity of claim 12, wherein the RS is configured such that for at least one symbol duration, the unpuncturable subset comprises an entire bandwidth of the RS for the at least one symbol duration.

23. The network entity of claim 12, wherein for each unpuncturable subset region of the RS, the flag is embedded in an orthogonal frequency division multiplexing (OFDM) pilot sequence of that unpuncturable subset region.

24. A method of wireless communication performed by a user equipment (UE), the method comprising:
receiving a reference signal (RS) from a non-serving cell, the RS comprising a puncturable subset and an unpuncturable subset, the puncturable subset comprising one or more resources of the RS that are allowed to be punctured, the unpuncturable subset comprising one or more resources of the RS that are prohibited from being punctured;
estimating a channel between the UE and the non-serving cell based on a measurement of the unpuncturable subset;
obtaining a measurement of the puncturable subset based on the estimated channel;
determining whether or not the puncturable subset has been punctured by another physical layer signal based on the measurement of the puncturable subset;
excluding the puncturable subset when processing the RS when it is determined that the puncturable subset has been punctured; and
including the puncturable subset when processing the RS when it is determined that the puncturable subset has not been punctured.

25. The method of claim 24, wherein the other physical layer signal is a physical layer channel carrying higher priority information.

26. The method of claim 24, further comprising:
receiving an RS configuration from a network entity, the RS configuration indicating a configuration of resources of the RS.

27. The method of claim 26, wherein the RS configuration is received through higher layer signaling, the higher layer signaling being signaling through one or more layers above a physical layer.

28. The method of claim 26, wherein the RS is configured such that the unpuncturable subset is contiguous in time, frequency, or both.

29. The method of claim 26, wherein the RS is configured such that for at least one symbol duration, the unpunctured subset comprises an entire bandwidth of the RS for the at least one symbol duration.

30. A method of wireless communication performed by a network entity, the method comprising:
configuring a reference signal (RS) such that the RS is puncturable by another physical layer signal, the RS comprising a puncturable subset and an unpuncturable subset, the puncturable subset comprising one or more resources of the RS that are allowed to be punctured, the unpuncturable subset comprising one or more resources of the RS that are prohibited from being punctured, and the RS being configured such that when the RS is transmitted, the unpuncturable subset of the RS indicates whether the puncturable subset of the RS has or has not been punctured; and
providing an RS configuration to a user equipment (UE), the RS configuration indicating the configuration of resources of the RS,
wherein the RS is configured such that the puncturable subset comprises a plurality of puncturable subset regions, and the unpuncturable subset comprises a plurality of unpuncturable subset regions associated with the plurality of puncturable subset regions, and
wherein a flag is embedded in each unpuncturable subset region of the RS to indicate whether or not each associated puncturable subset region of the RS has been punctured.

* * * * *